United States Patent
Fein et al.

(10) Patent No.: US 8,385,977 B2
(45) Date of Patent: *Feb. 26, 2013

(54) CELLULAR COMMUNICATION SYSTEM WITH HIGH SPEED CONTENT DISTRIBUTION

(75) Inventors: Robert A. Fein, Newton Centre, MA (US); Prasanna Adhikari, San Diego, CA (US); Eric Korevaar, La Jolla, CA (US); John Lovberg, San Diego, CA (US)

(73) Assignee: Trex Enterprises Corp, San Diego, CA (US)

( * ) Notice: Subject to any disclaimer, the term of this patent is extended or adjusted under 35 U.S.C. 154(b) by 1234 days.

This patent is subject to a terminal disclaimer.

(21) Appl. No.: 12/080,709

(22) Filed: Apr. 3, 2008

(65) Prior Publication Data

US 2008/0207200 A1 Aug. 28, 2008

Related U.S. Application Data

(63) Continuation-in-part of application No. 11/249,787, filed on Oct. 12, 2005, now Pat. No. 7,680,516, and a continuation-in-part of application No. 11/327,816, filed on Jan. 6, 2006, now Pat. No. 7,769,347, which is a continuation-in-part of application No. 10/799,225, filed on Mar. 12, 2004, now Pat. No. 7,062,293, which is a continuation-in-part of application No. 09/952,591, filed on Sep. 14, 2001, now Pat. No. 6,714,800, which is a continuation-in-part of application No. 09/847,629, filed on May 2, 2001, now Pat. No. 6,556,836, and a continuation-in-part of application No. 09/882,482, filed on Jun. 14, 2001, now Pat. No. 6,665,546.

(51) Int. Cl.
*H04M 1/00* (2006.01)

(52) U.S. Cl. ............... 455/561; 455/422.1; 455/423; 455/424; 455/426.1; 455/428; 455/560

(58) Field of Classification Search .................. None
See application file for complete search history.

(56) References Cited

U.S. PATENT DOCUMENTS

| | | | | |
|---|---|---|---|---|
| 4,827,265 A * | 5/1989 | Das et al. | | 342/78 |
| 6,016,313 A * | 1/2000 | Foster et al. | | 370/330 |
| 6,061,562 A * | 5/2000 | Martin et al. | | 455/431 |
| 6,518,916 B1 * | 2/2003 | Ashihara et al. | | 342/70 |
| 6,714,551 B1 * | 3/2004 | Le-Ngoc | | 370/401 |
| 6,757,268 B1 * | 6/2004 | Zendle | | 370/338 |
| 7,218,936 B2 * | 5/2007 | Rinne et al. | | 455/447 |
| 7,277,942 B2 * | 10/2007 | Inoue et al. | | 709/225 |
| 2001/0041572 A1 * | 11/2001 | Lundqvist et al. | | 455/450 |
| 2002/0062472 A1 * | 5/2002 | Medlock et al. | | 716/1 |
| 2002/0086675 A1 * | 7/2002 | Mansour | | 455/442 |
| 2003/0027523 A1 * | 2/2003 | Lim | | 455/12.1 |
| 2005/0260983 A1 * | 11/2005 | DiPiazza | | 455/426.1 |
| 2009/0215450 A1 * | 8/2009 | Baldemaier et al. | | 455/434 |

OTHER PUBLICATIONS

Federal Communications Comission, Mar. 3, 2005, Memorandum Opinion and Order FCC 05-45, pp. 1-39.*

* cited by examiner

*Primary Examiner* — Rafael Pérez-Gutiérrez
*Assistant Examiner* — Suhail Khan
(74) *Attorney, Agent, or Firm* — John R. Ross

(57) ABSTRACT

A communication system and method that combines with direct high data rate links at least one content distribution networks with a number of base stations of at least one cellular communication networks. In preferred embodiments the high data rate direct communication links between the content distribution networks and the base stations include millimeter wave radio links and the cellular communication networks are provided with third or fourth generation communication equipment providing data rates in excess of 40 Mbps. In a preferred embodiment millimeter wave links operating at data rates in the range of about 1.25 Gbps or greater in frequency ranges of within the range of 71 GHz to 86 GHz provide communication channels between base stations and points of presence of the content distribution network.

7 Claims, 32 Drawing Sheets

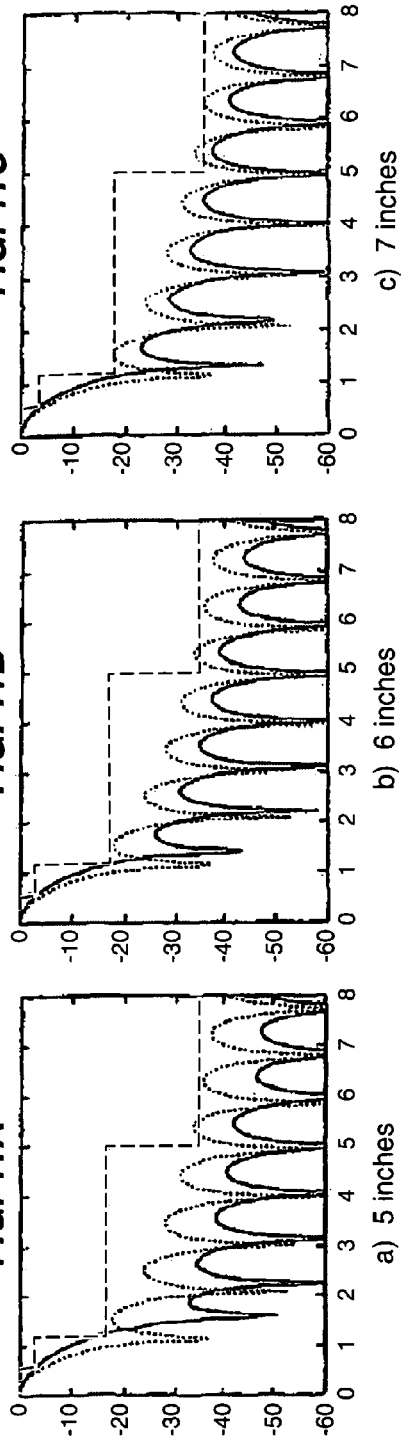
Antenna sidelobes (dB) vs. angle (degrees). Lens diameter 9.85 inches, Beam Diameter on lens (1/e power point) as given. Stepped curve FCC requirements. Dotted curve uniform illumination. Solid curve as predicted for Gaussian illumination.

a) 6 inches b) 9 inches

Antenna sidelobes (dB) vs. angle (degrees). Lens diameter 9.85 inches, frequency 83.5 GHz, Beam Diameter on lens (1/e power point) as given. Stepped curve FCC requirements. Dotted curve uniform illumination. Solid curve as predicted for Gaussian illumination.

SPLIT BLOCK VIEW

CELLULAR COMMUNICATION SYSTEM WITH HIGH SPEED CONTENT DISTRIBUTION

CROSS REFERENCE TO RELATED APPLICATIONS

This application is a continuation-in-part application of Ser. No. 11/249,787 filed Oct. 12,2005 and Ser. No. 11/327, 816 filed Jan. 6, 2006, now U.S. Pat. No. 7,680,516 which are continuations in part of Ser. No. 10/799,225 filed Mar. 12, 2004, now U.S. Pat. No. 7,062,293, which was a continuation-in-part of Ser. No. 09/952,591 filed Sep. 14, 2001, now U.S. Pat. No. 6,714,800 that in turn was a continuation-in-part of Ser. No. 09/847,629 filed May 2, 2001, now U.S. Pat. No. 6,556,836, and Ser. No. 09/882,482 filed Jun. 14, 2001, now U.S. Pat. No. 6,665,546.

FIELD OF INVENTION

The present invention relates to cellular communication systems and advanced Internet networking systems such as content distribution and digital rights management networks in particular to networks combining features of both cellular systems and such advanced Internet networking systems.

BACKGROUND OF THE INVENTION

Local Wireless Radio Communication

Local wireless communication services represent a very rapidly growing industry. These services include paging and cellular telephone services and wireless internet services such as WiFi and WiMax. WiFi refers to communication systems designed for operation in accordance with IEEE 802.11 standards and WiMax refers to systems designed to operate in accordance with IEEE 802.16 standards. Communication under these standards is typically in unlicensed portions of the 2-11 GHz spectral range although the original IEEE 802.16 standard specifies the 10-66 GHz range. Use of these WiFi bands does not require a license in most parts of the world provided that the output of the system is less than 100 milliwatts, but the user must accept interferences from other users of the system. Additional up-to-date descriptions of these WiFi and WiMax systems are available on the Internet from sources such as Google.

The cellular telephone industry currently is in its second generation with several types of cellular telephone systems being promoted. The cellular market in the United States grew from about 2 million subscribers and $2 billion in revenue in 1988 to more than 60 million subscribers and about $30 billion in revenue in 1998 and the growth is continuing in the United States and also around the world as the services become more available and prices decrease. By 2006, there were more than 220 million cellular subscribers in the United States. Wireless computer networking and Internet connectivity services are also growing at a rapid rate. Wireless mobile service providers moved from first to second generation systems by converting from analog services in the 800-900 MHz band to digital services with multiple different spectra. These second generation systems operate at bit rates in the range of 1 to 2 million bits per seconds (MB/s). While second generation systems supported data distribution for the first time in cellular systems, they did so only with limited bandwidth Third generation systems will provide digital communications with many different standards with much higher bandwidth. Many third generation systems will be provided with even higher bandwidth and fourth generation systems are expected to provide bandwidths in the range of 450 MHz or greater.

FIG. 1 describes a typical cellular telephone system. A cellular service provider divides its territory up into hexagonal cells as shown in FIG. 1. These cells may be about 5 miles across, although in densely populated regions with many users these cells may be broken up into much smaller cells called micro cells. This is done because cellular providers are allocated only a limited portion of the radio spectrum. For example, one spectral range allocated for cellular communication is the spectral range: 824 MHz to 901 MHz. (Another spectral range allocated to cellular service is 1.8 GHz to 1.9 GHz) A provider operating in the 824-901 MHz range may set up its system for the cellular stations to transmit in the 824 MHz to 851 MHz range and to receive in the 869 MHz to 901 MHz range. The transmitters both at the cellular stations and in devices used by subscribers operate at very low power (just a few Watts) so signals generated in a cell do not provide interference in any other cells beyond immediate adjacent cells. By breaking its allocated transmitting spectrum and receive spectrum in seven parts (A-G) with the hexagonal cell pattern, a service provider can set up its system so that there is a two-cell separation between the same frequencies for transmit or receive, as shown in FIG. 1. A one-cell separation can be provided by breaking the spectrum into three parts. Therefore, these three or seven spectral ranges can be used over and over again throughout the territory of the cellular service provider. In a typical cellular system each cell (with a transmit bandwidth and a receive bandwidth each at about 12 MHz wide) can handle as many as about 1200 two-way telephone communications within the cell simultaneously. With lower quality communication, up to about 9000 calls can be handled in the 12 MHz bandwidth. Several different techniques are widely used in the industry to divide up the spectrum within a given cell. These techniques include analog and digital transmission and several techniques for multiplexing the digital signals. These techniques are discussed at pages 313 to 316 in The Essential Guide to Telecommunications, Second Edition, published by Prentice Hall and many other sources. Third generation cellular communication systems promise substantial improvements with more efficient use of the communication spectra.

Wi-Fi is a popular name for a variety of standards for wireless local area networks (WLAN's). Typically, they use unlicensed spectra. Third generation cellular systems and Wi-Fi are similar in many respects. Both are wireless systems that provide their services through nodes, referred to "base stations" in case of third generation cellular and "access points" in case of Wi-Fi, that provide local coverage. Both are access technologies that require backhaul to the public wire line network. Third generation cellular and Wi-Fi require backhaul to the wire line networks to provide end-to-end functionality.

Third generation systems have the same business model as prior mobile generations of mobile service provision. They are top-down services in which providers acquire limited access to the spectrum through acquisition of government licenses. Due to limited access to the spectrum, these services typically have relatively high quality of service, especially as compared with Wi-Fi systems that typically rely on unlicensed spectra. At its core a Wi-Fi network is essentially a cellular network that relies on a base station and end-user nodes connected by radios.

Fourth generation service models include the WiMax (an acronym for Woldwide Interoperability for Microwave Access) will they will have much higher bandwidth than third generation systems. WiMax is actually several different protocols enabling delivery of last mile wireless broadband access as an alternative to fixed cable and telephone company DSL systems and also as an alternative to cellular phone systems. WiMax refers to systems designed to operate in accordance with IEEE 802.16 standards. Qualcomm claims that its Ultra Mobile Broadband technology will support theoretical mobile data speeds of up to 280 megabits per second, using multiple-input, multiple output antenna technology. The inexorable push for increased bandwidth in cellular systems results in a push for the kinds of high-bandwidth services are available through the wired Internet, including mission-critical networking and video and audio applications.

Cellular Backhaul

Cellular backhaul refers to the connection of the wireless transmissions of cellular telephone and data systems to communication offices that are connected to wire line systems. Backhaul includes both the systems employed by wireless service providers that provide telephone and data services as well as ad hoc communication networks, such as Wi-Fi networks established by enterprises for purposes of extending their local area networks and for other purposes. Very few cellular base stations have fiber at the base station and most cellular providers rely on low-bandwidth backhaul services provided by wireline service providers. In fact, fewer than 5% of cellular network base stations have fiber connections to their central offices. Rather, most cellular providers rely on T1/E1 lines leased from telephone companies or other wire line providers. Third generation services will require on the order of four to six T1 lines, which will result in large increases in costs for wireless service providers. Furthermore, these estimates relate only to third generation services. The situation will be compounded with a move to WiMax or other fourth generation systems. A typical prior art cellular base station is shown in FIG. 16. It consists of a cellular antenna 6 mounted on a cellular tower 10 and connected to a base station transceiver 12 by means of coaxial cable 8. The base station transceiver 12 is responsible for transmission of signal to mobile stations 2 and reception of signal from mobile stations 2 through the wireless interface 4 by means of cellular antenna 6. The base station transceiver 12 is also responsible for, among other things, transmission and reception of data through its cellular network 18 through backhaul link 14. Cellular network 18 is in turn connected to the Internet 26 through router 20.

Adoption of New Standards

New networking technologies typically are not adopted in one fell swoop. Rather, communication service providers typically roll out new services over time so that users of second generation services may exist at the same time that providers are rolling out 2½ generation and third generation services. The same is expected to occur when providers move to fourth generation services. As a result, providers in many cases have to provide backhaul to their central offices from base stations using a variety of circuits and protocols. For example, second generation cellular systems typically rely on time division multiplexing, but third generation systems rely on Internet or ATM protocols. As a result, carriers provide backhaul through different circuits applicable to different leased lines. Base stations may also have separate circuits for network monitoring and switching functions.

Increased Bandwidth

The amount of bandwidth that will be required for distribution of information over the Internet will greatly increase over the next several years due to the above trends and due to increasingly high-bandwidth services distributed over the Internet. These include applications like live video and audio. As the Internet increasingly includes cellular communication as a part of the Internet, cellular communication systems will become much higher bandwidth systems. The shift in wireless traffic from predominantly voice to data such as mobile video creates a dramatic change in the bandwidth required for backhaul. For example:

Circuit switched voice systems require only 7-12 kbps for voice traffic.

Mobile video requires 80-300 kbps—typically at least 180 kbps, or 20 times more bandwidth than voice over a comparable time period.

Translating that into an analysis of the current backhaul capacity of a typical cell site, the cell site would support less than hour of video service per month—less than two minutes per day. In addition, the nature of data transmission from video, camera downloads and enterprise distribution of data—the factors that are propelling the need for increased backhaul—is that the bandwidth growth is much more unpredictable than voice. This means that to maintain high quality of service, much more capacity is required. This will result in transmission or receipt of large amounts of data from a relatively small number of users in a cell site. For example, typical music downloads require one megabyte per minute of a downloaded song, networked games typically require about three megabytes per session, video downloads typically require about 9.2 megabytes per download, browsing of the Internet with a personal data assistant (PDA) requires about one megabyte per ten minute session and laptop browsing requires about three megabytes for a ten minute session. According to some estimates video transmission over the Internet, which is minimal now may by 2011 account for 86 percent of all wireless backhaul requirements in the United States.

Problems of Information Distribution

Distribution of information over any network is subject to many sources of failure, some of these sources are listed below:

Path failure—the connection between any two sites (with the proliferation of sites and the inherently lower reliability in a wireless network, the opportunity for path failure increases substantially;

Machine failure—the failure of servers throughout the network, which of course will increase as cellular base station servers are added to network complexity;

Region/Rack Failure—the failure of whole regions of the network due to machine or software failures or external sources such as power failures, which also will increase as cellular providers suffer these failures;

Network failures from downtime at Internet Service Providers; and

Global Internet failure from worms and other attacks.

There are several inherent deficiencies of wireless system as compared to wire line systems. The first set of limitations stems from the limited bandwidth of wireless as compared with wire line distribution and the more error-prone distribution channels. Wireless distribution is inherently lower in bandwidth and also has inherently higher bit error rates. In addition re-transmissions needed to recover from these errors induce variable delay across wireless channels. A second set of problems stems from the mobility of wireless clients. When mobile users move from one cell to another, the handoff mechanism results in interruption of an ongoing session. As a result, (i) different channels may vary significantly in signal, (ii) the handoffs almost always result in packet loss resulting in further losses on top of the inherent loss in wireless systems and (iii) relative path lengths to from server to clients varies as client move across the network.

There have been many attempts at increasing the reliability of wireless networks through the deployment of mesh networking typologies that allow for circumvention of failed network paths. A recent study indicates that even with as 17-hop delivery mesh network, a typical wireless network still achieves only 92% packet delivery with 5% channel loss over each hop. There have also been various protocols developed that are designed to minimize the impact of wireless deficiencies. Some of these are discussed in the following section.

Latency

It is often thought that light travels so quickly that the time taken for it to get from its source to its target would be irrelevant. One would thus expect communication latency to be negligible. Unfortunately, that is not necessarily the case as the following examples illustrate.

Latency in a packet-switched network is measured either one-way (the time from the source sending a packet to the destination receiving it), or round-trip (the one-way latency from source to destination plus the one-way latency from the destination back to the source). A typical packet of information will be forwarded over many links via many gateways, each of which will not begin to forward the packet until it has been completely received. The minimal latency is the sum of the minimum latency of each link, plus the transmission delay of each link except the final one, plus the forwarding latency of each gateway.

Content Distribution Networks

The most effective techniques to protect vast networks from path failures and the like to assure latency protection and effective packet delivery is the deployment of content distribution networks (CDN's). Content distribution networks are distributed computing platforms that rely on distributed servers (or even peer-to-peer use of end-user computers) and sophisticated mathematical algorithms to optimize information distribution. These networks enhance the efficiency of information distribution through optimal routing and caching functions. They also ensure more reliable information distribution through redundancy and guaranteed delivery mechanisms. The first web content based CDNs were Sandpiper, Mirror Image and Skycache followed by Akamai and Digital Island. The first video based CDN was iBEAM Broadcasting.

Currently there are approximately 30 different types of content delivery providers on the market. They all range in size, type, reach and reliability. Major CDN's include Akamai, Limelight Networks and CDNetworks. Other companies, such as EdgeCast Networks, Bitgravity, PantherExpress, Internap, Highwinds and others are just launching their services. Most CDN's are focused on video delivery or other high-bandwidth services within the United States. Only a few CDN's are capable of delivering content on a global scale. On a global scale, only Akamai, CDNetworks and Limelight have the network deployed to deliver high performance in all global major markets. CDN nodes are deployed in multiple locations, often over multiple backbones. These nodes cooperate with each other to satisfy requests for content by end users, transparently moving content behind the scenes to optimize the delivery process. Optimization can take the form of reducing bandwidth costs, improving end-user performance, or both. The number of nodes and servers making up a CDN varies, depending on the architecture, some reaching thousands of nodes with tens of thousands of servers.

Requests for content are intelligently directed to nodes that are optimal in some way. When optimizing for performance, locations that can serve content quickly to the user may be chosen. This may be measured by choosing locations that are the fewest hops or fewest number of network seconds away from the requestor, so as to optimize delivery across local networks. When optimizing for cost, locations that are less expensive to serve from may be chosen instead. Often these two goals tend to align, as servers that are close to the end user sometimes have an advantage in serving costs, perhaps because they are located within the same network as the end user.

The Internet was designed according to the end-to-end principle. This principle keeps the core network relatively simple and moves the intelligence as much as possible to the network end-points: the hosts and clients. As a result the core network is specialized, simplified, and optimized to only forward data packets. Content distribution networks augment the end-to end transport network by distributing on it a variety of intelligent applications employing techniques designed to optimize content delivery. The resulting tightly integrated overlay uses web caching, server-load balancing, request routing, and content services. These techniques are briefly described below.

Because closer is typically better, web caches store popular content closer to the user. These shared network appliances reduce bandwidth requirements, reduce server load, and improve the client response times for content stored in the cache.

Server-load balancing uses one or more layer 4-7 switches, also known as a web switch, content switch, or multilayer switch to share traffic among a number of servers or web caches. Here the switch is assigned a single virtual Internet protocol address. Traffic arriving at the switch is then directed to one of the real web servers attached to the switch. This has the advantages of balancing load, increasing total capacity, improving scalability, and providing increased reliability by redistributing the load of a failed web server and providing server health checks. A content cluster or service node can be formed using a layer 4-7 switch to balance load across a number of servers or a number of web caches within the network.

Request routing directs client requests to the content source best able to serve the request. This may involve directing a client request to the service node that is closest to the client, or to the one with the most capacity. A variety of algorithms and techniques are used to route the request. These include server load balancing algorithms, domain name request routing, rewriting HTML requests, and the replication of severs in multiple locations. Proximity, i.e. choosing the closest service node, is estimated using a variety of techniques including reactive probing, proactive probing, and connection monitoring.

Service providers increasingly provide value-added services beyond basic data transport. Features such as virus scanning and parental control are being offered, hoping to increase service attractiveness, user loyalty, revenue, and profit. Web caches and service nodes distributed throughout the content delivery network provide convenient dispatch points for connecting to enhanced services. This handing of messages off for further processing is sometimes called vectoring of messages.

Two protocols suites are designed to provide access to a wide variety of content services distributed throughout a content network. The Internet Content Adaptation Protocol (ICAP) was developed in the late 1990's to provide an open standard for connecting application servers. A more recently defined and robust solution is provided by the Open Pluggable Edge Services (OPES) protocol. This architecture defines OPES service applications that can reside on the OPES processor itself or be executed remotely.

Most importantly, content distribution networks seek to overcome the limitations of conventional caching methods. If all information distributed over the Internet were static, caching the information for subsequent delivery would provide a reliable means of information distribution. Dynamic content, however, requires active caching so that the cached memory can be refreshed. If this has to happen in real time or at least very often, it can place huge constraints on the network. Content distribution networks overcome this limitation by strategic positioning of servers over the network and complicated algorithms that are designed to optimize network performance.

One such proprietary content distribution network employs a pull-based quorum approach that enables distribution of information updates to servers that serve as storage points when a majority request the data and allows other servers that are down to receive the data from peers through an index merging technique. It uses this quorum-based approach because database mirroring proved to be impractical when taking into account the need to acquire software licenses for the database program employed and because of the difficulty of tracking network problems in a generic way through one database (thus preventing the successful implementation of an auto-replicating database). Because no hard drive is 100% reliable (especially during periods of high input-output activity), the system provides for high degrees of redundancy, guaranteed delivery mechanisms to assure that content was in fact delivered and manual protection through network operating centers.

Other content distribution networks may be free, public-source networks that are peer-to-peer networks such as the Coral network being deployed by researchers at New York University. That network simply directs users to other sites on the network through browsers to enable the caching required for content distribution. The success of such a self-forming network is, of course, dependent on the level of voluntary participation. There are other similar academic-sponsored content distribution networks, including networks developed by researchers at Princeton University, Vrije Universiteit in The Netherlands, and at Saitama University in Japan.

Persistence

Users obtain information over the Internet by accessing information stored on remote servers. Users access this information through an address obtained from the host that maintains the server. Persistence occurs if the first time a request is made for an Internet protocol address of a hostname from a given user, a persistent entry is stored on the server that ties that user to the Internet protocol address. Subsequent requests from the same user for the address of the domain name first requested will return the same address that was returned the first time, so long as the server at that address can handle the request. To handle persistence, a domain name server can maintain a table that contains a mapping of machine Internet addresses and hostnames to Internet addresses. When processing a domain name server request, the server consults the table to determine if a persistent entry exists that ties a machine IP address (identifying a group of users) and hostname to IP address. Persistent tables can be very large. Typically, when multiple DNS servers manage a hostname, each individual server needs access to the persistence table. This leads to a significant amount of network traffic overhead when the tables are kept synchronized between multiple servers. Most existing approaches simply do not allow more than one load balancing DNS server to be authoritative for a given domain name when using persistence. Persistence is supported when only a single DNS server is authoritative for a given domain name in these approaches. Similarly, latency tables and other tables that are keyed off a user group (Client DNS Server) are either kept in a single location or are synchronized across multiple servers where the full latency table is kept on each server.

Limitations of Today's Content Distribution Networks

The persistence of a network is a key factor in reliable quick network delivery over the Internet. The time to provide information between routers is a key factor in persistence. Wireless techniques for maintenance of network integrity suffer from interference from time to time resulting in poor radio frequency signal-to-noise ratio. These factors lead to delays due to the higher buffering used to deal with bandwidth mismatches between network links and the available bandwidth in the wireless network. The resulting delays and packet losses translate into the kinds of network failures that content distribution networks are designed to overcome.

The problem is especially great for large files such as live video transmission files. Most information distributed over the Internet today consists of small files. The proliferation of high-bandwidth services, however, runs counter to this trend and jeopardizes the integrity of CDN's. Large files distributed in a content distribution network can evict thousands of regular files from CDN servers. As a result large files result in more caching and buffering. Much like cell phone traffic in modern wireless networks, a potential solution is to break the large file into smaller fragments for distribution through CDN's. In any case as large files are increasingly distributed over lower bandwidth wireless networks, the risk to overall network performance increases.

Proxy Servers

Typical wireless systems employ proxy servers that provide functionality similar to a server from a client's perspective. Although often transparent in a given application, certain streaming media applications make known their reliance on proxy servers. The proxy server thus typically provides a caching function for delivery of data. The server, however, does not rise to the level of functionality provided in a CDN or digital rights management network.

Digital Rights Management

In addition to the complexity associated with the distribution of the content, there is also the issue of digital rights management associated with ensuring that only users entitled to data receive it. The prior art does not provide good digital rights management solutions.

Reliability Requirements

Reliability typically expected for trunk line wireless data transmission is very high, consistent with that required for hard-wired links including fiber optics. Typical specifications for error rates are less than one bit in ten billion ($10^{-10}$ bit-error rate), and link availability of 99.999% (5 minutes of down time per year). This necessitates all-weather link operability, in fog and snow, and at rain rates up to 100 mm/hour in many areas. On the other, hand cellular telephone systems and wireless internet access systems do not require such high reliability. As a matter of fact cellular users (especially mobile users) are accustomed to poor service in many regions.

Weather Conditions

In conjunction with the above availability requirements, weather-related attenuation limits the useful range of wireless data transmission at all wavelengths shorter than the very long radio waves. Typical ranges in a heavy rainstorm for optical links (i.e., laser communication links) are 100 meters, and for microwave links, 10,000 meters.

Atmospheric attenuation of electromagnetic radiation increases generally with frequency in the microwave and millimeter-wave bands. Excitation of rotational modes in oxygen and water vapor molecules absorbs radiation preferentially in bands near 60 and 118 GHz (oxygen) and near 23 and 183 GHz (water vapor). Rain attenuation, which is caused by large-angle scattering, increases monotonically with frequency from 3 to nearly 200 GHz. At the higher, millimeter-wave frequencies, (i.e., 30 GHz to 300 GHz corresponding to wavelengths of 1.0 centimeter to 1.0 millimeter) where available bandwidth is highest, rain attenuation in very bad weather limits reliable wireless link performance to distances of 1 mile or less. At microwave frequencies near and below 10 GHz, link distances to 10 miles can be achieved even in heavy rain with high reliability, but the available bandwidth is much lower.

Setting-Up Additional Cells in a Telephone System is Expensive

The cost associated with setting up an additional cell in a new location or creating a micro cell within an existing cell with prior art techniques is in the range of about $650,000 to $800,000. (See page 895 Voice and Data Communication Handbook, Fourth Edition, published by McGraw Hill.) These costs must be recovered from users of the cellular system. People in the past have avoided use of their cellular equipment because the cost was higher that their line telephones. Recently, costs have become comparable.

E-Band

In 2005 the United States Federal Communication Commission set aside a portion of the radio communication spectrum for regulated narrow beam millimeter wave communication. A small fee is paid to the FCC for a license to communicate in a narrow channel between two GPS points. The reserved frequency bands lies in the frequency ranges from 71 to 76 gigahertz (GHz), 81 to 86 GHz and 92 to 95 GHz. These reserved bands are referred to as "E-Band" frequencies. It is being used for short range, high bandwidth communications.

The Need

Therefore, a need exists for a system and method to provide high data rate communication for cellular communication while keeping the Internet free from some of the complications inherent in cellular communication systems.

SUMMARY OF THE INVENTION

The present invention provides a communication system and method that combines with direct high data rate links of at least one content distribution network with a number of base stations of at least one cellular communication network. In preferred embodiments the high data rate direct communication links between the content distribution networks and the base stations include millimeter wave radio links and the cellular communication networks are provided with third or fourth generation communication equipment providing data rates in excess of 40 Mbps. In a preferred embodiment millimeter wave links operating at data rates in the range of about 1.25 Gbps or greater in frequency ranges of within the range of 71 GHz to 86 GHz provide communication channels between base stations and points of presence of the content distribution network. In some preferred embodiments a single millimeter wave link is used to connect a single content distribution network with more than one cellular base station. In some preferred embodiments, a service monitoring unit is included at some of the base stations to monitor the content distribution network service. And in some embodiments a digital rights management server is provided to monitor communication passing through at the base stations.

BRIEF DESCRIPTION OF THE DRAWINGS

FIG. 11 is a set of drawings showing the comparison with FCC requirements of side lobe patterns for lenses having diameters ranging from 5 inches to 10 inches at a frequency of 73.5 GHz.

DETAILED DESCRIPTION OF PREFERRED EMBODIMENTS

Figure 17:
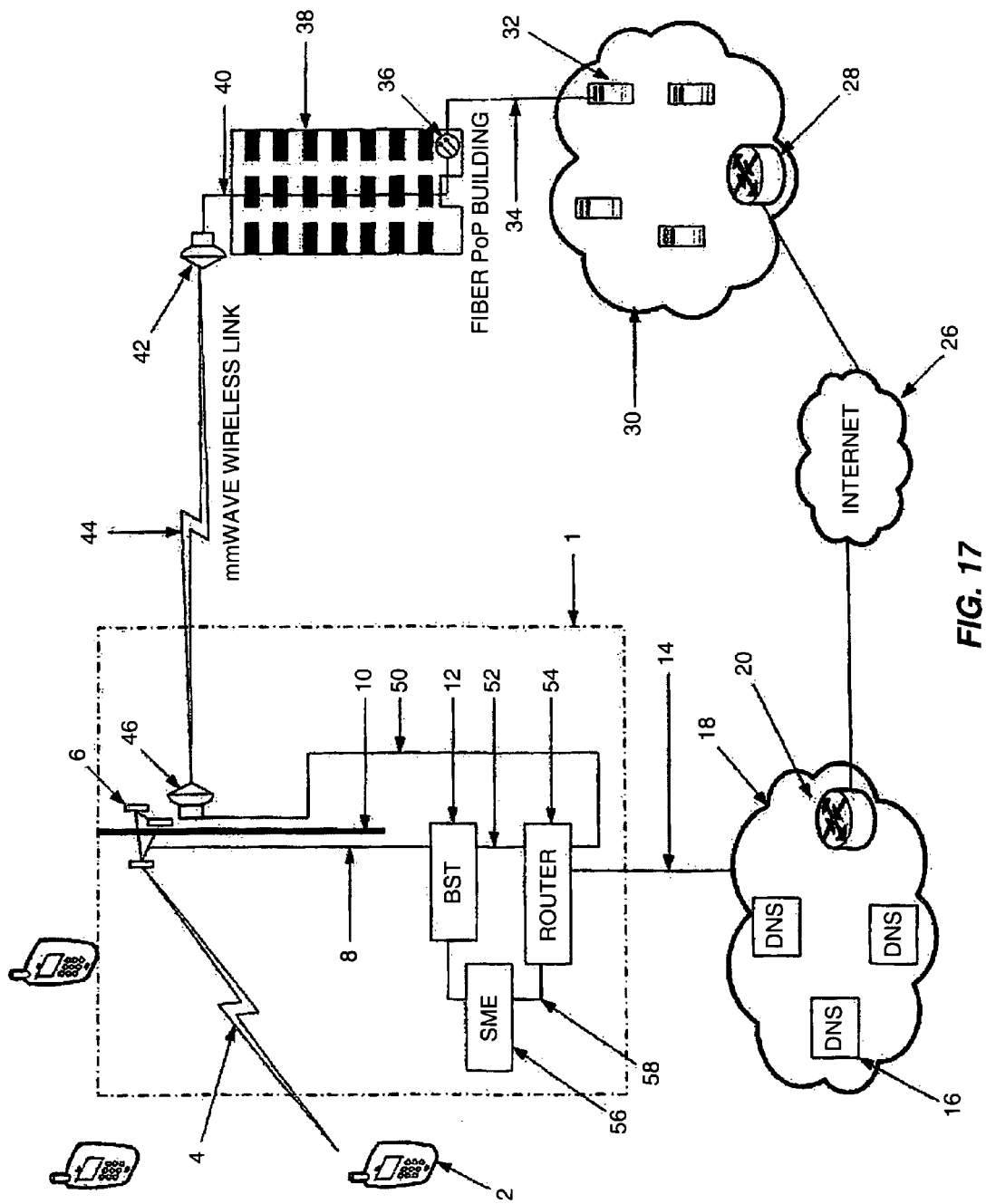
FIG. 17 is a drawing describing features of a first preferred embodiment of the present invention.

Direct High Data Rate Connection between Base Stations to Content Distribution Network A first preferred embodiment of the present invention provides a system and method of delivering electronic content over mobile wireless networks that takes advantage of the more flexible architecture of subsequent generations of mobile networks and the many advantages of prior art content distribution networks. The present invention provides high bandwidth communication links between wireless operators' base stations and content distribution networks. Important features of this first preferred embodiment are illustrated in FIG. 17. Shown in FIG. 17 is a cellular base station 1 in communication with a content distribution network 30 via a high data rate communication link. In this embodiment the high data rate communication link connecting the base station to a content distribution network includes a high bandwidth millimeter-wave wireless link 44 operating at 1.25 Gbps.

The base station transceiver 12 in the preferred embodiment includes fourth generation advanced cellular wireless equipment. Its network interface is a Gigabit Ethernet interface and the transport protocol used by the base station transceiver 12 over its network interface is Internet Protocol (EP). The base station is equipped with a router 54 connected to the base station transceiver 12 through its Gigabit Ethernet interface by means of a fiber optics cable 52. Router 54 has two additional data interfaces as compared to typical prior art base stations. One of the interfaces, a Gigabit Ethernet interface, connects the base station equipment with a millimeter-wave wireless radio 46 by means of a fiber optics cable 50. The other interface of the router is connected to the wireless operator network 18 by means of a backhaul link comprising a bundle of four T-1 lines 14 in accordance with prior art techniques. The four T1 lines are bundled together utilizing third party (such as a local telephone company) equipment that are commonly available to create a single logical communication channel to the wireless operator's network.

The base station 1 also includes a service monitoring unit 56. The primary purpose of service monitoring unit 56 is to communicate with base station transceiver 12, router 54 and the operation, administration and management units of both the cellular operator and content distribution network operator to manage, administer and monitor the network resources. In the preferred embodiment, the service monitoring unit 56 is illustrated as an entity separate from the base station transceiver 12 and router 54.

High Data Rate Communication Link

In the preferred embodiment illustrated in FIG. 17, millimeter wave wireless radio 46 is connected to its counterpart millimeter wave wireless radio 42 located on top of a building 38 to establish a millimeter wave wireless link 44 operating at 1.25 Gbps as explained above. Radio 42 is connected to a fiber point-of-presence 36 located in the building 38 by means of a fiber optic link 40. The fiber point of presence is in turn an Internet point of presence on a content distributor network 30 through fiber optic connection 34 to a server unit 32. In this preferred embodiment, fiber optic cable 50, radio 46, millimeter wave wireless link 44, radio 42, fiber optic cable 40, fiber optic point-of-presence 36 and fiber optic cable 34 create a high bandwidth 1.25 Gbps communication between router 54 at base station 1 and the content distributor network 30.

Content Distribution Network

The content distribution network 30 in this embodiment includes of a large number of servers 32 serving a large number of sub-networks. The content distribution network 30 is connected to the Internet 26 by means of one or more gateway routers 28.

Cellular Operator Network

The wireless cellular operator network 18 also includes of a large number of servers, including domain name servers 16. Network 28 as in the prior art is also connected to the Internet by means of one or more gateway routers 20.

Typical Scenario

A typical use scenario may consist of a mobile user 2 trying to watch the latest episode of popular TV show Lost through his handheld mobile radio. The user's device 2 would at first make a request for the content from a specific Universal Resource Locator (URL), such as http://dynamic.abc.go-.com/streaming/landing. The software client within the user's device at first makes a request to a domain name server 16 located within cellular operator network for the Internet protocol address of the server with the domain name go.com. The domain name server replies with the Internet protocol address 123.123.1.5.123 serving the domain name www.go.com. Once the mobile client knows the address of the server serving the domain name, it makes a HTTP request to the server at that address for the content from URL locator. The http request for the content by the mobile station 2 is made in the form of Internet protocol data packets. When the http requested packet is received by router 54 from base station transceiver 12, router 54 forwards the request to its destination through the cellular operator's network 18, which in turn forwards the request to the server in the Internet 26 through its gateway router 20. When the request for content is received by the server 123.123.1.5, the server identifies a better method to serve the content to the user. With the knowledge that the base station 1 is directly connected to its content distribution network 30 by means of high bandwidth link 44, it identifies a cache server 32 and content distribution network 30 as the best method for delivering the content to the user 2. It therefore sends a response to the client software of user 2 redirecting it to fetch the content from server 32 with Internet protocol address 123.123.2.5. The client makes a redirected request to the server at 123.123.2.5 for the content again. The Internet protocol packet consisting of the http request for the content to Internet protocol address 123.123.2.5 is forwarded by router 54 toward server 32 over its wireless connection 44 to the content distribution network 30. The server, in response to the request, sends the requested content to the end user 2 over the high bandwidth wireless connection 44, completely obviating the need to make use of the backhaul link 14 of the cellular operator.

Service Monitor Unit

Service monitor unit (SMU) 56 allows the network operators to perform operation, administration and management functions as well as usage monitoring for admission control, resource reservation and billing purpose. For example, when the content requested by the user begins to be served through the high-speed wireless link 44, the cellular operator may need to make sure that sufficient bandwidth is available in the wireless connection 44 to deliver the bandwidth. The wireless operator needs to make sure that the content distributor is indeed eligible to make use of the high bandwidth and the user is eligible to receive the content on his or her handheld device. Additionally, based on the amount of the traffic delivered, the wireless operator may bill the content distributor appropriate fee. Service monitor unit 56 provides a diverse set of technical and business interoperation that can be provided. However in some cases, such as when the content distribution network is owned and operated by the cellular operator, service monitor unit 56 may not be needed.

Benefits of the Present Invention

One of the key benefits of connecting a wireless base station directly with a content distribution network is to compensate for one of the shortcomings of typical wireless channels. Wireless channels are susceptible to error events, often resulting in very inefficient operation of the transmission control protocol (TCP) of the Internet used to deliver content such as web pages. Each time a TCP packet is irrecoverably lost due to error events in wireless channels, the lost and all the subsequent packets need to be retransmitted by the sender. Having a slower communication channel between the base station and the server and having to go through several levels of hierarchy in this channel can cause the TCP session to slow down significantly. An Internet protocol network with a high bandwidth channel and flat hierarchy can improve the performance of the TCP sessions. Performance of TCP can be further optimized by moving servers close to the base station, a technique that will be discussed below. A further advantage inures to those who run content distribution networks since the delivery of large amounts of information over slower-bandwidth, high path failure wireless networks will jeopardize the overall performance of the CDN.

Multi-Carrier Mobile Networks

It is often the case that in each mobile market, there are several mobile operators offering their services, and it is often the case that the base stations of these mobile operators are co-located at the same tower. Since each operator's network is independent of the other's, no resources are generally shared by the operators. For content distributor's perspective, this results in a very inefficient method of convent delivery to the end users of these wireless operator's networks. For example, during unfolding of popular events such as the Super Bowl, users of different networks often access identical content such as scores, statistics and perhaps even live video. However, content for different users in different wireless networks would have to be delivered separately.

Figure 18:
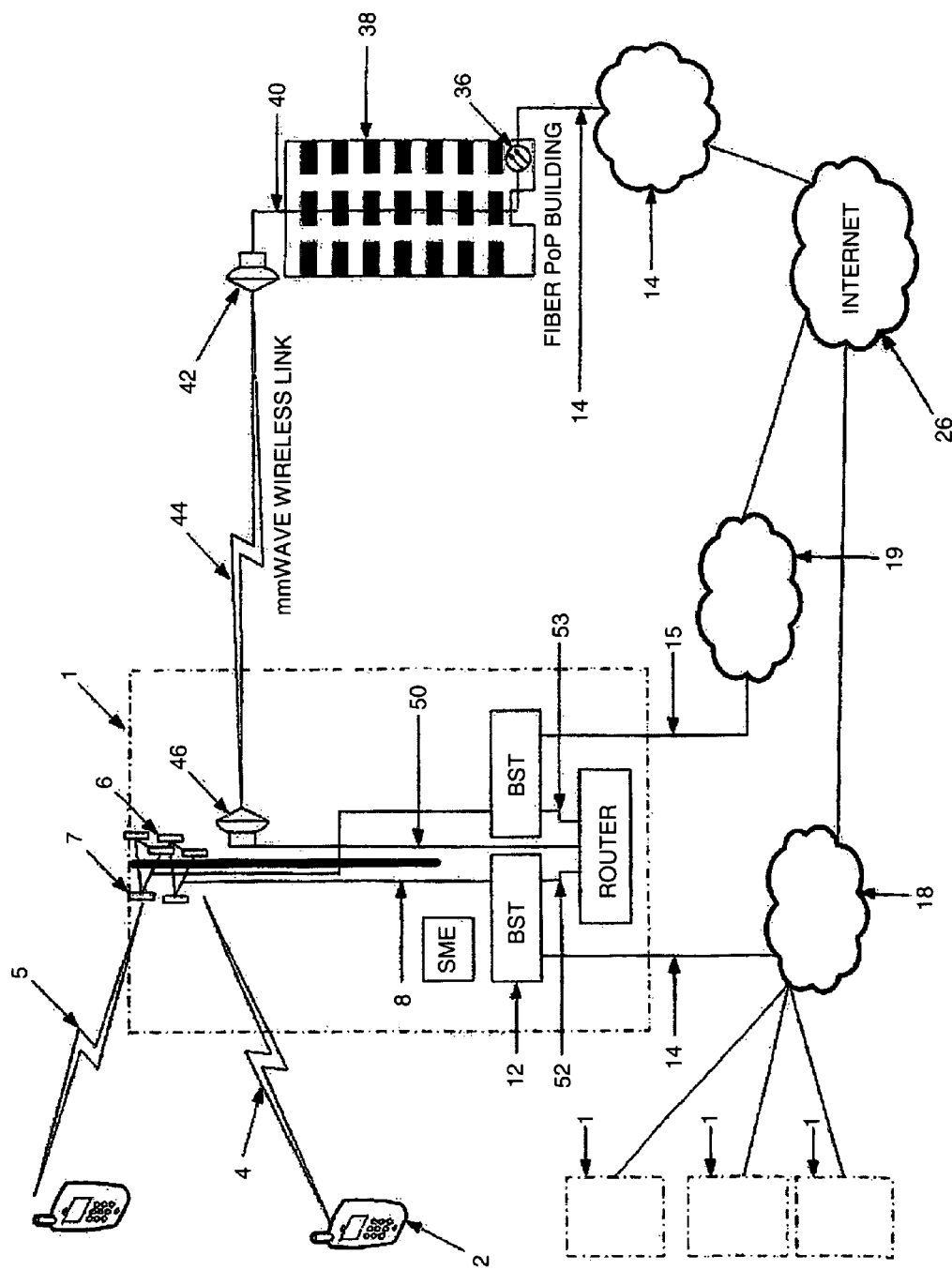
FIG. 18 is a drawing describing features of a second preferred embodiment of the present invention.

One of the benefits of bringing the content distribution network to the "edge" of the wireless network, by connecting to a CDN directly from a base station as proposed here, is that a single content distribution network may be shared among multiple mobile operators to deliver content to their customers. FIG. 18 illustrates the preferred embodiment of this method in which a content distribution network is connected to a tower hosting the equipment of two base stations, each belonging to a different wireless operator. In this illustration, the base station equipment of each operator is connected to a common router, such as a Cisco 7200 router, which is in turn connected to content distributor's network by means of millimeter wave gigabit wireless link. Each of the two mobile operator networks is directly connected to its respected base station equipment. This is done to ensure that the two operators' networks remain entirely independent of each other, while still being able to share a common set of equipment for their connection to the content distribution network.

Following the typical operational scenario described in conjunction of FIG. 18, in this application, the initial request made by the mobile subscriber of each user would first be routed to the domain name server with their respective network. The domain name server, however, would redirect the requester to fetch the content directly from the network of the content distributor. Subsequent delivery of the content to each mobile user would be accomplished directly through the common high bandwidth wireless link.

There are several benefits that this method allows for both the content distributor and wireless operators to realize. First, it obviates the need for the content distributor to deploy separate or independent network in order to serve content to the users of each network. Second, it allows the content distributor to deliver content more efficiently by using methods such as multicasting. The method also allows for interoperation with heterogeneous wireless network. For example, one wireless operator may makes use packet switched network (e.g. Ethernet) as its backhaul and another may make use of circuit switched network (e.g. T1) as its backhaul. Furthermore, one wireless operator's network may be based on a 3GPP standard while the other operator's standard may be based on 3GPP2 standard or WiMAX standard. Even in presence of such diverse types of wireless network, simple content distribution network would be able to deliver content reliably to the user of these networks. Finally, as explained above, the present invention helps to protect the integrity of the content distribution network.

Caching at the Edge of the Network

One of the key attributes of a content distribution network is the efficiency it gains by caching high demand content closer the user of the content. The contents that are expected to be high in demand are moved to cache servers located at the edge of the content distributor's network and served from these cache servers. This simple technique reduces amount of traffic in the core network and reduces load on the central servers.

There are at least two limitations that content distributors face in delivering content in traditional wireless networks. The first limitation is their inability to cache the content close to the edge of the network. There are no provisions in traditional wireless network to cache content at the edge of the network. As explained above, the problem is particularly acute for information that must be dynamically refreshed. The second limitation is their inability to move content to the edge of the wireless network, such as base station, as they find necessary to optimize their network performance. Because cellular operators own the backhaul network, content distributors cannot deploy optimal information distribution techniques. Due to these limitations, content distributors do not have the flexibility, as they often do in wire line network, to preemptively move the content to the edge of their network as they find it necessary.

Figure 19:
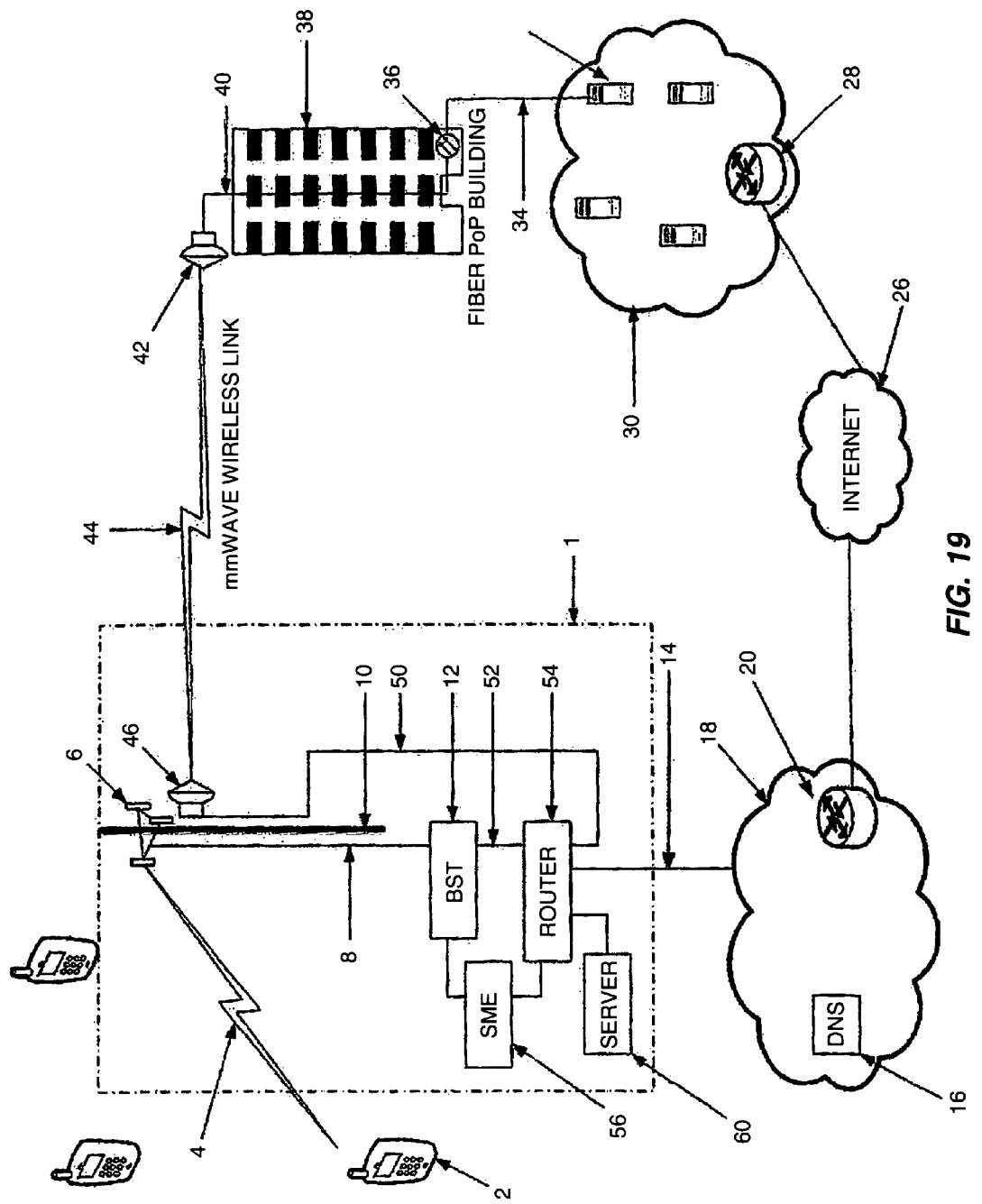
FIG. 19 is a drawing describing features of a third preferred embodiment of the present invention.

The proposed architecture of connecting to the content distributor's network from base stations by means of independent high bandwidth links can be further extended to allow caching of content at the base station. An illustration of this extended network topology is given in FIG. 19. In this topology, a cache server 60 is connected to router 54, from which some content may served to the mobile stations wirelessly connected to the base station. If base stations of multiple operators are connected to the router, mobile users of both the operators may also be served the same cache server.

With the proposed architecture, the content distributors can not only cache the content at the base station and serve from the base station but also move the content to the edge as they find necessary without involving the wireless operator in any fashion. For example, during a live coverage of a Super Bowl game, a content distributor may preemptively move all the Super Bowl related pages of ESPN.com to the cache server located at the base station. Such techniques would be virtually impossible or highly inefficient when traditional methods of interfacing mobile wireless network with content distribution network are used.

The proposed architecture also allows content distributors to employ unique methods to deliver content over the wireless network. For example, one of the challenges of serving content over a wireless network is the performance of transmission control protocol (TCP), used to serve http pages, because of the error susceptibility of wireless communication. The TCP protocol is designed to deliver packets reliably over a large network and reacts to packet looses it experiences by significantly reducing its throughput. With the cache server located at the base station and having to transmit data over only a single hop wireless link to end users, however, the TCP algorithm used by the cache server can be optimized to operate over the wireless interface. More importantly, with the instantaneous knowledge of the state of the wireless channel, its transmission parameters can be adjusted to optimize delivery of content over the wireless link.

Figure 20:
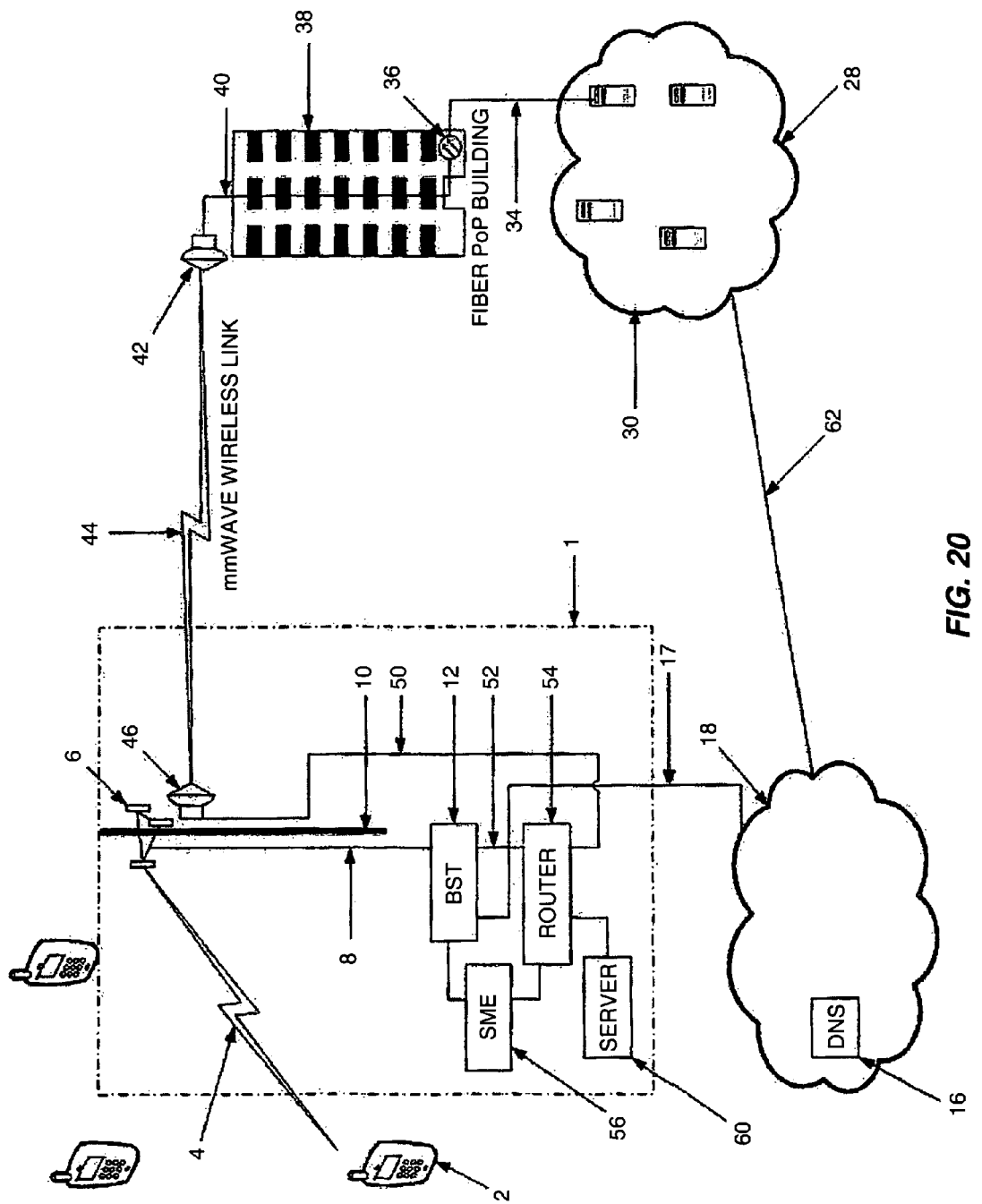
FIG. 20 is a drawing describing features of a fourth preferred embodiment of the present invention.

Using Content Distribution Networks to Deliver High Bandwidth Mobile Services Connecting each base station with the content distributor's network by means of a high bandwidth link creates additional opportunities for both the content distribution network operator/owner and wireless operators. In particular, with the wireless operator and content distributor both making use of Internet protocol to transport their traffic, wireless operators can make use of the content distribution network to deliver their services or content. One such scenario is illustrated in FIG. 20.

In this example, an incumbent mobile operator makes use of the content distributor's network to push its own content, such as e-mails and SMS, to the end users while it delivers services such as voice calls through its own network. The wireless operator may lease capacity from the content distributor's network to deliver services when its own network is congested. More importantly, this configuration also allows competitive mobile operators, to deliver their mobile services without having to create their own backhaul network by making use of the content distributor's network. Therefore, the architecture described here creates opportunities for content distribution networks to lease their network bandwidth to wireless operator or other content distributors. On the other hand, the architecture also creates opportunities for wireless network owners to lease their network resources to content distributors. In particular, the high speed links which connect a base station to a content distributor network may perhaps be owned by the wireless operator and leased to the content distributor.

Overlaying Content Distribution over Mobile Wireless Networks

This method of bringing a content distributor's network to the base station can be extended even further by creating a content distribution network that overlays the wireless operator network. With this extension, not only is a direct connection to the content distributor network created form a base station by means of a high bandwidth, but a content distribution network is created by interconnecting these base stations with each other by means of high bandwidth links.

Figure 21:
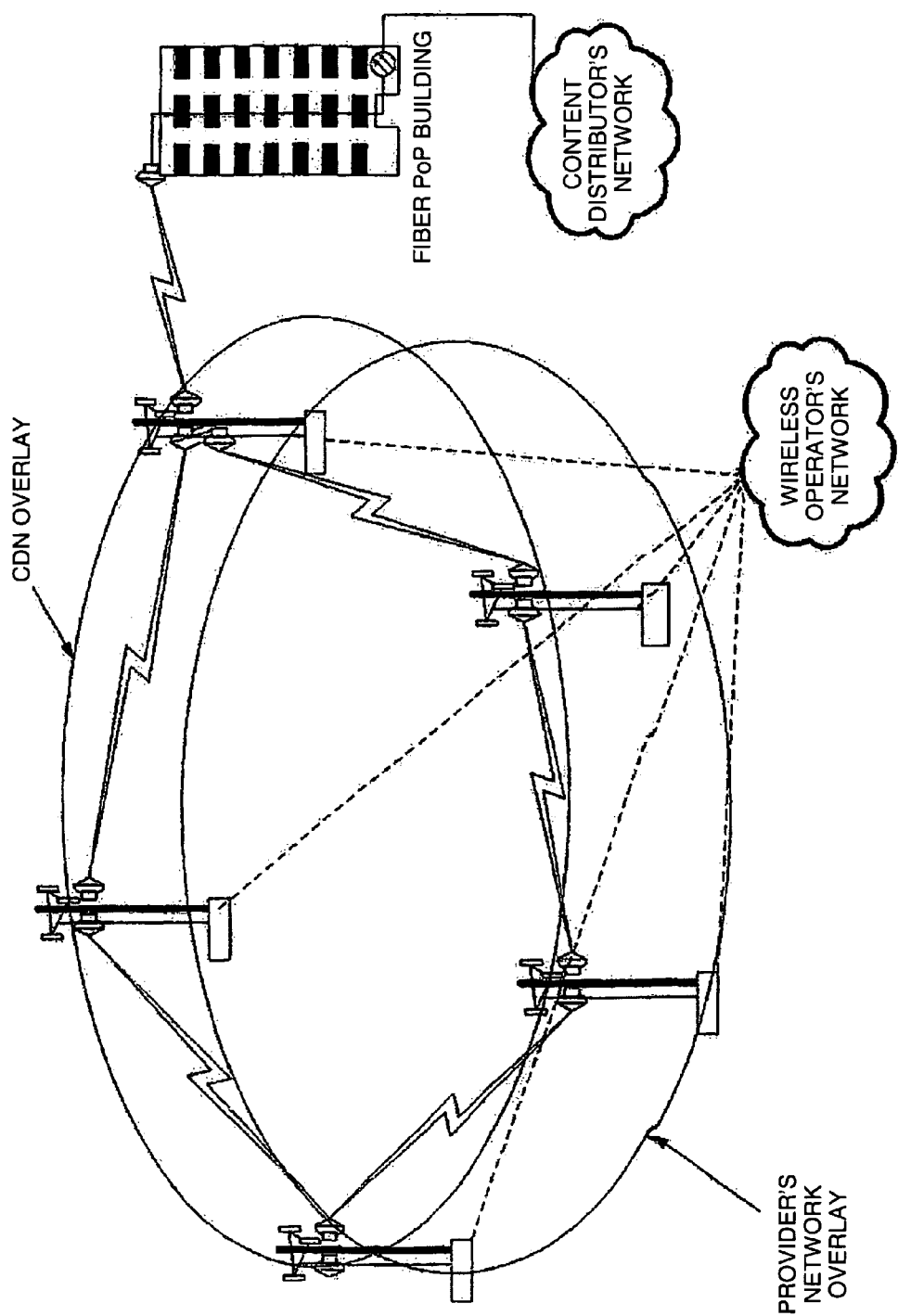
FIG. 21 is a drawing describing features of a fifth preferred embodiment of the present invention.

An example of this approach is illustrated in FIG. 21. It consists of five cell towers connected to the mobile operator's network, overlaid by a content distribution network. The mobile operator network makes use of multiple T1 lines to connect each base station to its central office. It makes uses of hub and spoke topology, well suited for such connections. A content distribution network is created by means of high bandwidth millimeter wave wireless links interconnecting the base stations in a ring topology. The wireless operator makes use of Internet protocol over SONET protocol to transport traffic over T1 lines and achieves 99.999% availability. The content distribution network uses Internet protocol over Ethernet to transport its traffic over high bandwidth links and achieves 1 Gbps throughput with 99.9% availability, sufficient for its business need. The content distributor makes use of its own independent routing algorithm to transport traffic to each base station, independent of what is being used by the wireless operator. In essence, a wireless content distribution network, completely independent of technical specification of the mobile operator's network, is created for mobile users.

The technique in essence allows for creation of content distribution networks overlaid on top of a wireless network, each tailored for its own service. It creates content distribution networks, overlaid on top of a mobile wireless network but completely independent of it, while still being able to push the content to the edge of the wireless network. It allows the content distribution network to be tailored to maximize its performance. For example, a video delivery network may be optimized for delivery of video from the server to the users with highly asymmetric bandwidth and multicasting capacity. In addition, a separate video conferencing network may be created to use lower capacity network, but optimized for low latency and jitter. The architecture allows for both of these networks, either logical or physical, to be overlaid on top of the mobile network. In addition, this architecture allows for the overlay of a digital rights management network on top of the mobile network.

Optimum Distribution of Content

Figure 22:
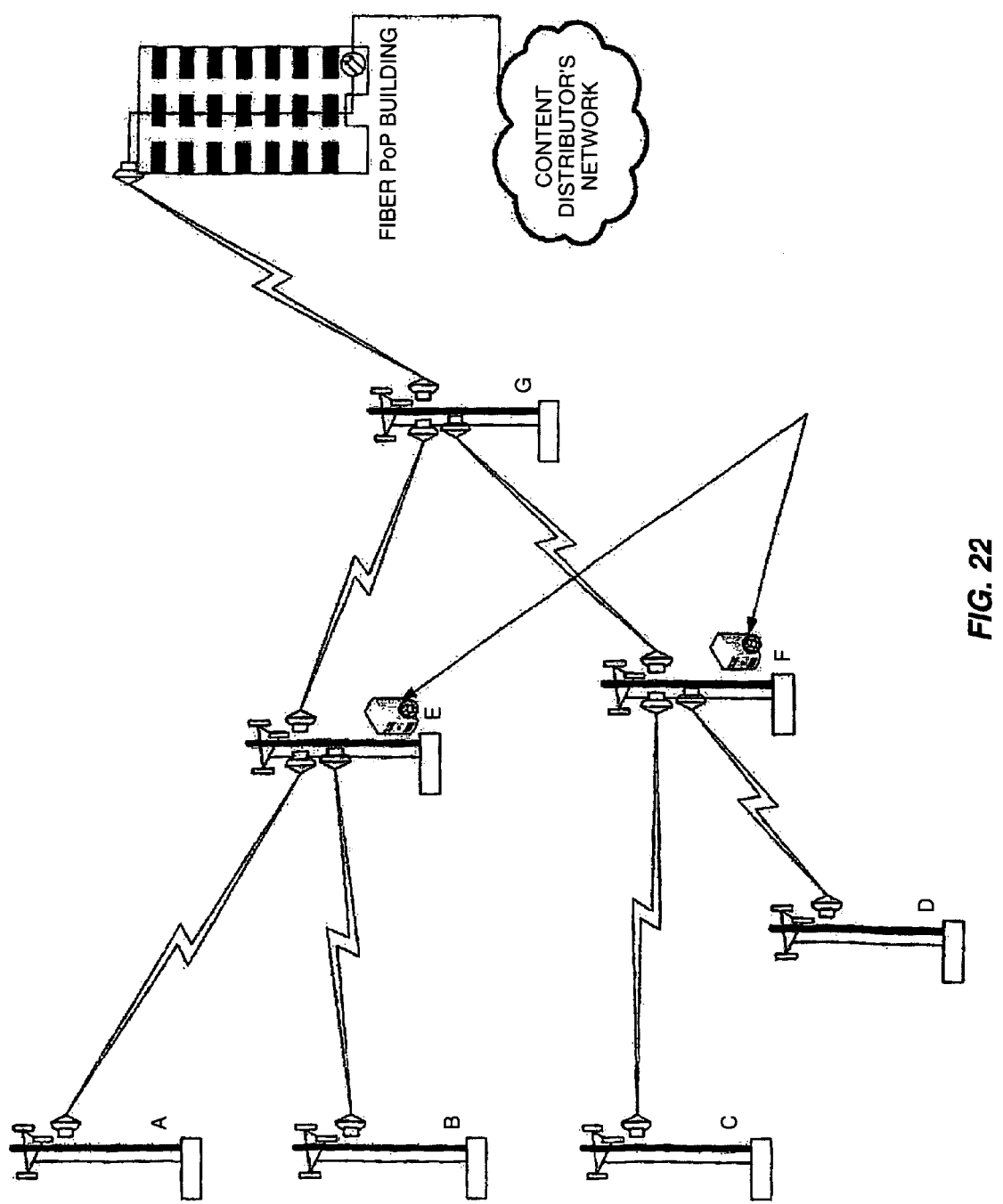
FIG. 22 is a drawing describing features of a sixth preferred embodiment of the present invention.

The method of dynamically distributing and re-distributing traffic to strategic servers throughout networks is one of the key hallmarks of content distribution network. Complex algorithms are used to distribute content among caches servers throughout a network and redirect content requests to these distributed servers so as to minimize network congestion and server overloads. Such efficient distribution of content is what makes a high performance content distribution network execute efficiently. As stated above, one of the limitations of the traditional wireless network has been the inability of content distributors to distribute the content through the traditional mobile wireless network. In the preceding sections, we proposed two methods, (1) a method to push the content to the base station (or close to the base station) (2) a method to create content distribution network by interconnecting the base stations independently. These two methods can be combined together to create a content distribution network capable of distributing and re-distribute content among cache servers throughout mobile wireless networks and able to balance service load among these servers. An illustration of this method is provided in FIG. 22 where all the base stations are interconnected with each other by means of high bandwidth wireless links to create content distribution network. Two of the base stations, F and G, are also fitted with content servers. In general, the server located at tower "F", would serve the content requests generated by towers A, B and E. However, if the cache server located at "F" is overloaded, the sever may redirect some of its requests to server "F". All these redistributions of load and traffic can be done by the network operator without any interaction with the wireless operator's network. All of the connections to content distribution network servers can also be linked to other advanced networking servers, including digital rights management servers.

Merging Wireline and Mobile Content Distribution Networks

Figure 23:
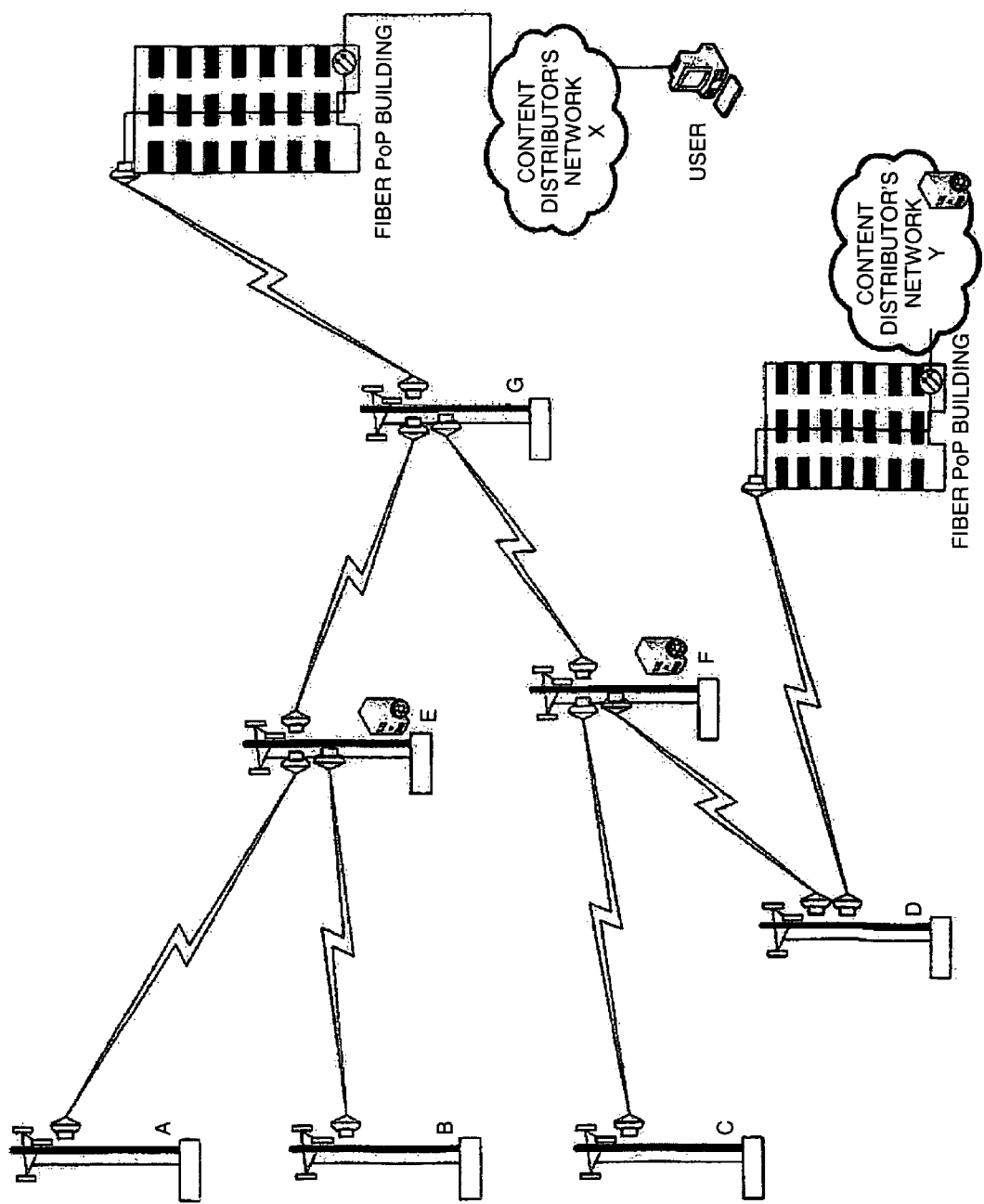
FIG. 23 shows an arrangement with two content distribution networks serving a mobile communication network.

In the preceding sections, Applicants have proposed novel methods of creating content distribution networks for mobile wireless networks that allows content distributors to realize all the benefits realized in wireline networks. Another approach is to merge wireline and mobile content distribution networks, as illustrated in FIG. 23. The illustration consists of a mobile content distribution network created by interconnecting towers A through G, by means of high bandwidth wireless links. The network includes content servers at towers E and F. The wireless network is connected to two content distribution networks, X and Y, by means of high bandwidth wireless links. With this configuration, the two content distribution networks, X and Y, are effectively merged with the wireless content distribution network. Such merger allows the content distributor to treat the merged network as a single network and make use of the resources available in the wireless network to optimize the performance of both the wired and wireless networks. For example, when appropriate, servers located in the wireless network may be used to serve content to users in network X or network Y. Content in network X may be moved to network Y through the wireless network and vice versa. In the similar fashion, content residing in a server in network Y may be served to users in network X via the wireless network.

Multicasting, Broadcasting and Mobility Management

Figure 13B:
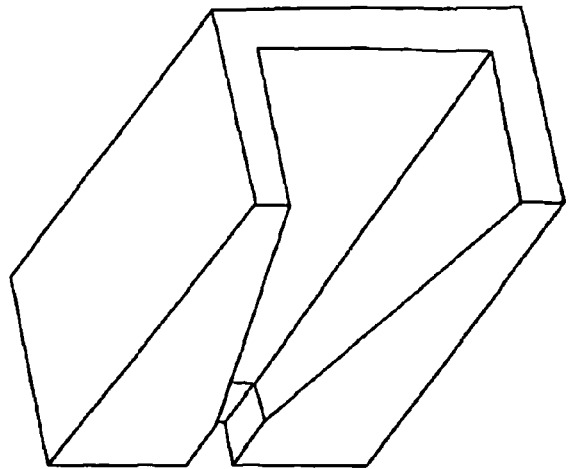
FIGS. 13A and 13B are drawings of a horn design.
Figure 13A:
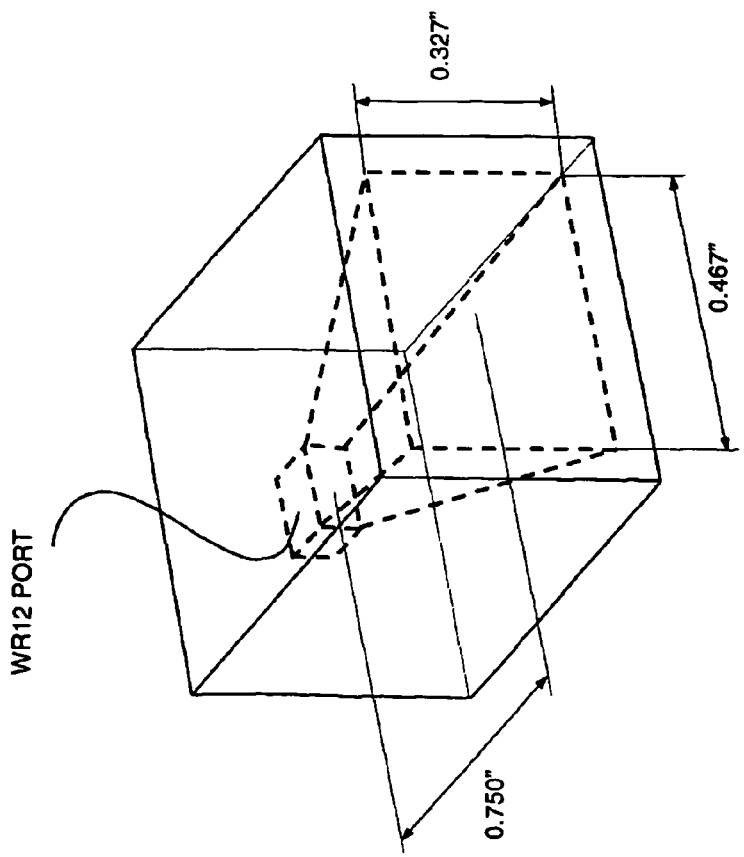

Multicasting and broadcasting are techniques that allow for delivering identical content to multiple user simultaneously while minimize the resources, both network and server resources. In the simplest description of the technique, a single copy of content is generated and transmitted by the server. As the content is transported through the network, it gets replicated as necessary and copies are transmitted to other networks by switches and routers along its path. One of the limitations of distributing content using traditional methods in a mobile network is the inability of the backhaul network to transmit the content efficiently by means of multicasting or broadcasting. With the network architecture proposed above, however, network utilization and server load can be minimized by making use of network multicasting and broadcasting techniques. In addition to multicasting and broadcasting more efficiently, other technical benefit may also be realized with the network architecture proposed here. One such benefit is simplified mobility management. As users move from one location to another while using network services, their services are moved from one base station to another. In the traditional network, as the services are moved from one base stations to another, the old end-to-end connections need to be removed and new connections need to be established in order to continue delivering the service, often resulting in network inefficiencies. The proposed architecture minimizes this inefficiency. As users move from one base station to another, the network can accommodate the new location by just updating the upstream router that aggregates traffic from the two base stations. For example, in FIG. 13, if a user's service move from tower C to tower B, only the router located at tower G would need to update its routing table. If Ethernet is being used to transport traffic, the Ethernet switch should be able to recognize the new location of the user and start sending traffic toward B instead of C. Therefore, the network can provide much simplified mobility management without loss of network efficiency.

Connections to Central Offices

Figure 24:
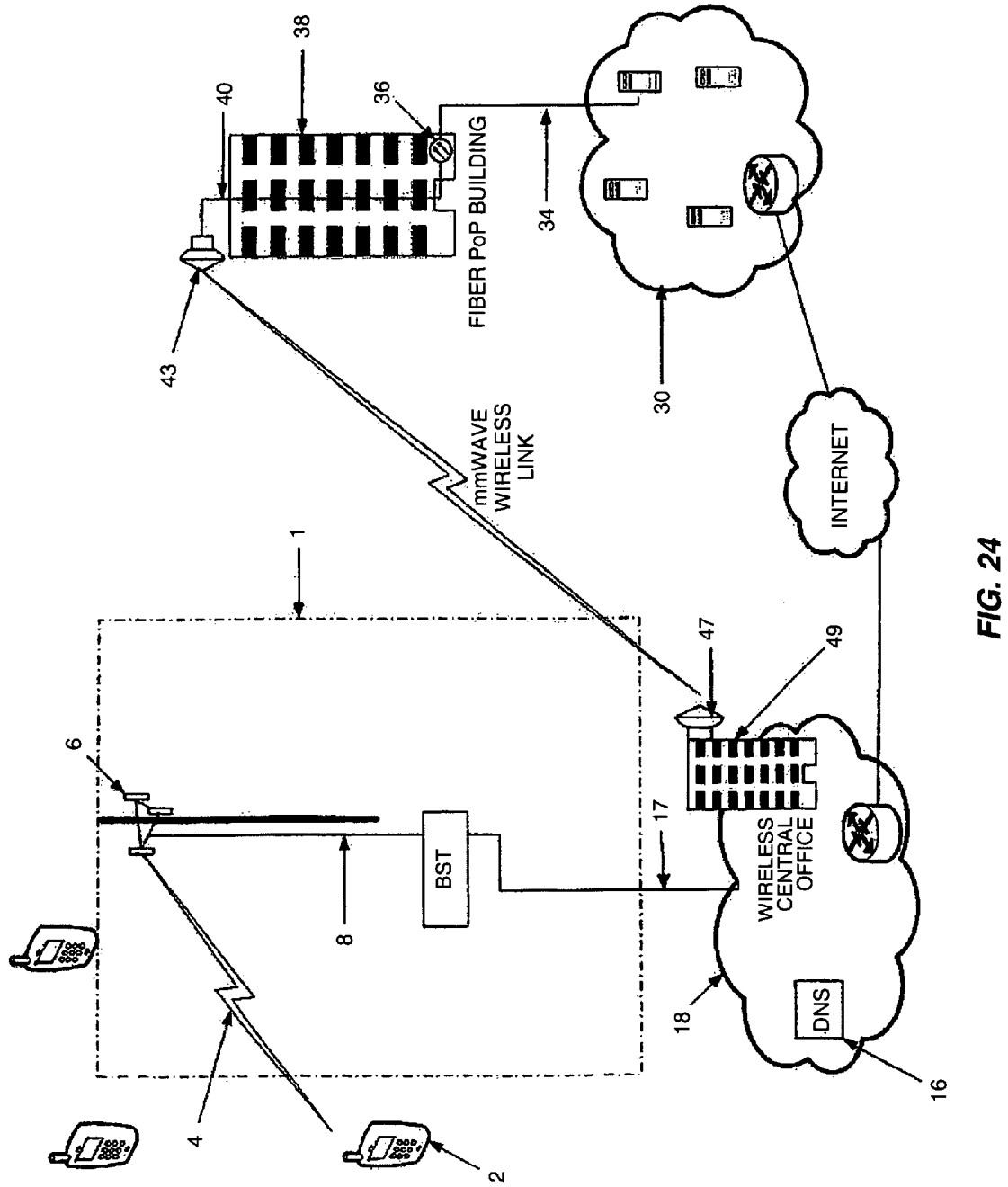
FIG. 24 shows a high speed connection to a central office such as a telephone central office that is in turn connected to a content distribution.

FIG. 24 shows an embodiment of the present invention in which a high speed millimeter wave link with transceivers 43 and 47 connects a content distribution network 30 and a mobile communication system central office 49. From the central office high data rate communication is provided out to various base stations then on to mobile customers.

Connecting Base Stations with Content Distribution Networks

The present invention requires a high data rate link between cellular base stations and content distribution networks. These high data rate links could be provided by any communication link capable of providing data rates of at least one gigabit per second or more and could include fiber optic or coaxial cable. These could be buried or overhead. Microwave systems could be uses if the needed bandwidth is available. Laser communication systems could be used but a backup system may be needed for bad weather situations. If the link is provided with T1 lines, a large number of lines could be required.

Millimeter Wave Radio Links

The preferred embodiment incorporates a millimeter wave link operating in the E-band spectral range. Applicants and their fellow workers pioneered this millimeter wave communication technology as evidenced by the parent patent applications and issued patents referred to in the second paragraph of this specification, which have been incorporated by reference herein. For completeness, descriptions of these millimeter wave links taken from parent applications are described below. The following descriptions also include use of millimeter wave links for connecting base stations to each other and the cellular system central offices. Applicants have also included below techniques for providing the interface between the cellular base stations and the millimeter wave links.

E-Band Millimeter Wave Communication

United States Federal Communication Commission (FCC) regulations define a minimum 3 dB divergence angle of 1.2 degrees, a minimum antenna gain of G=43 dBi, side lobe reduction between 1.2 degrees and 5 degrees of G-28, and side lobe reduction of 35 dB between 5 and 10 degrees off axis. (There are further side lobe reduction requirements at larger angles).

Lens-Based Transceiver

Figure 8A:
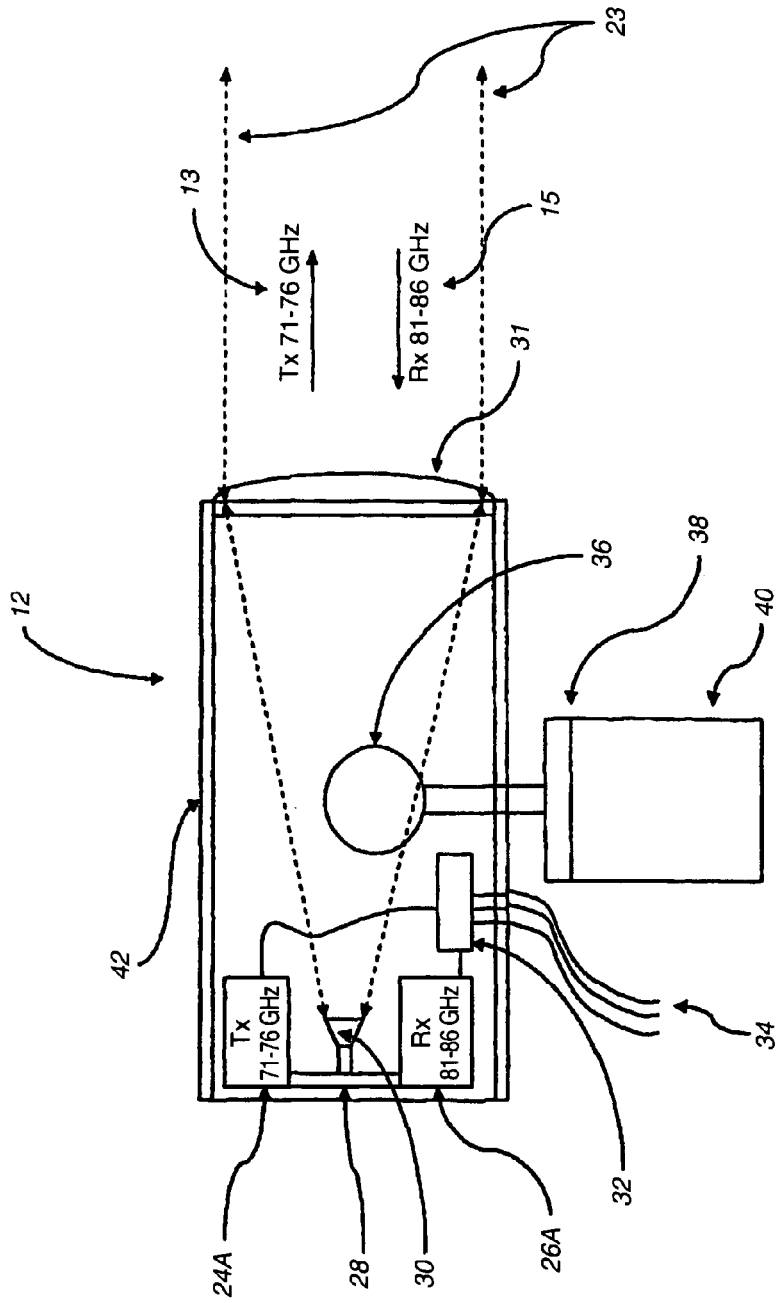
FIG. 8A is drawing of a lens-based millimeter wave transceiver for transmitting at 71-76 GHz and receiving at 81-86 GHz.
Figure 8B:
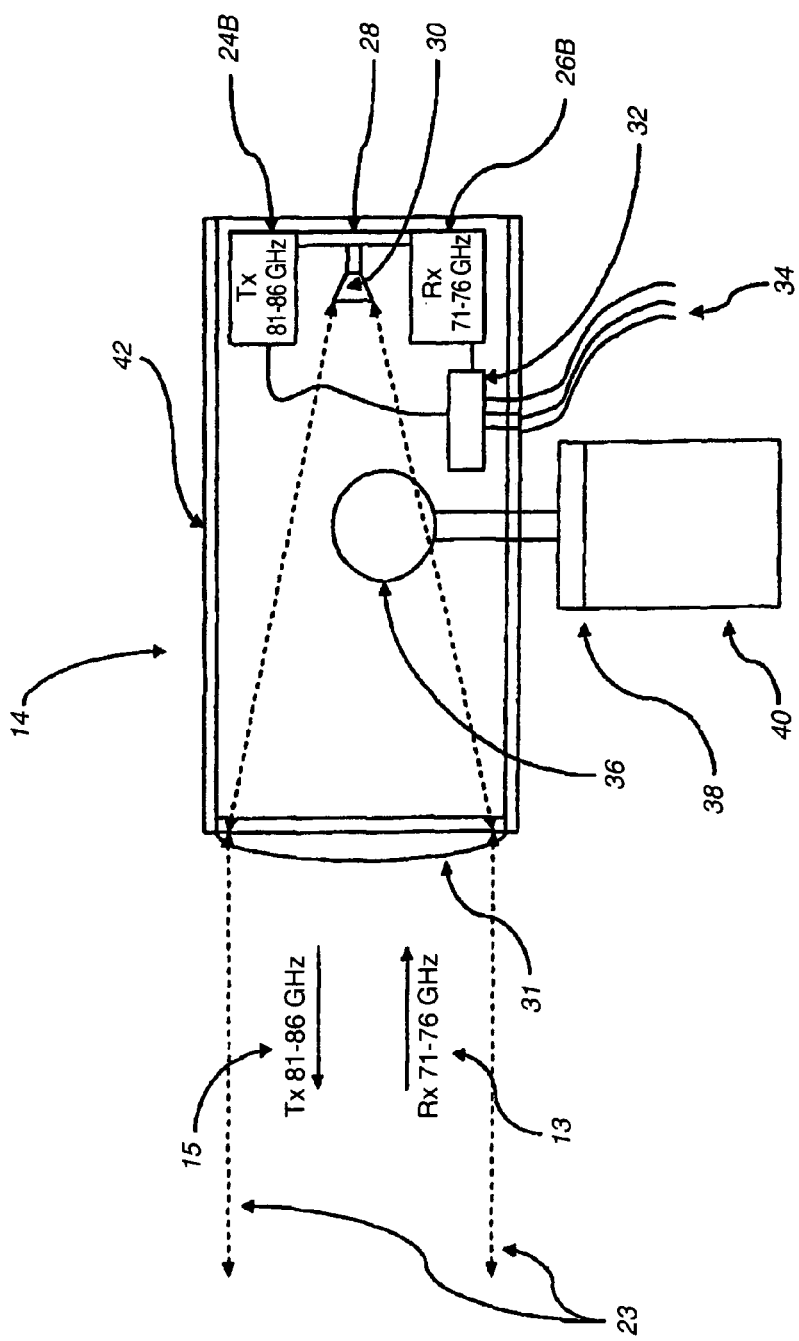
FIG. 8B is drawing of a lens-based millimeter wave transceiver for transmitting at 81-86 GHz and receiving at GHz 71-76.
Figures 9A, 9B:
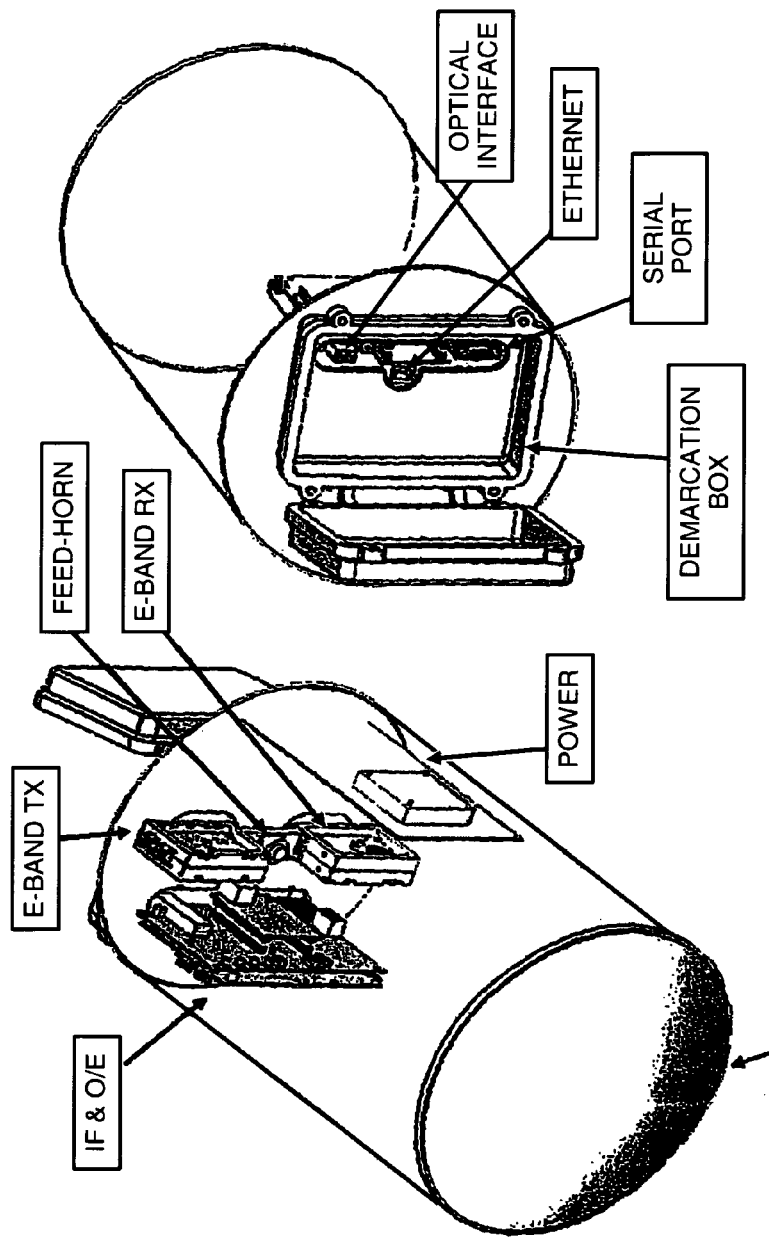
FIG. 9 is a layout of lens-based millimeter wave transceiver in cylindrical housing.
Figure 10:
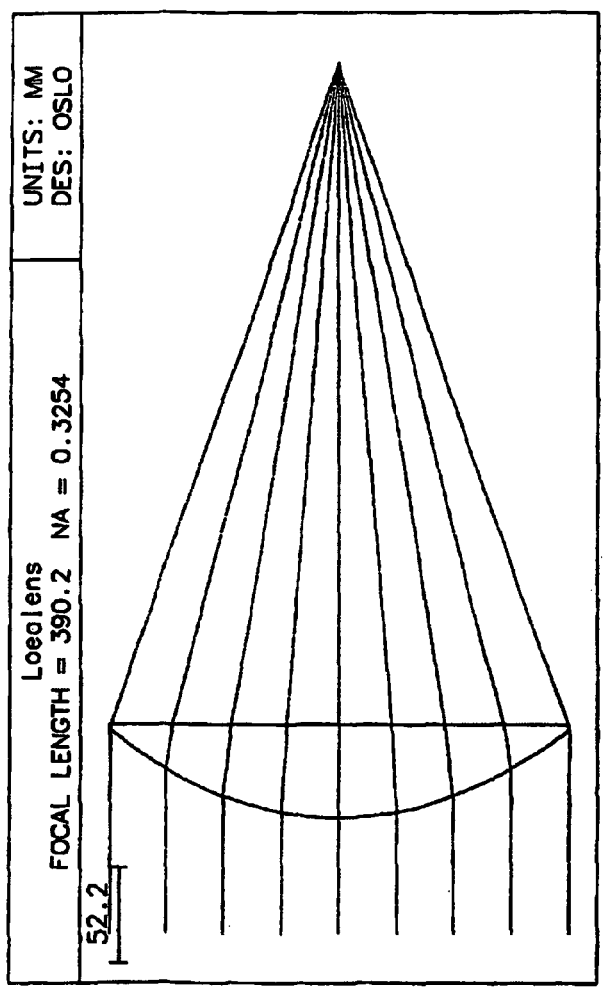
FIG. 10 is a drawing showing the optical parameters of a preferred lens design.
Figure 12A:
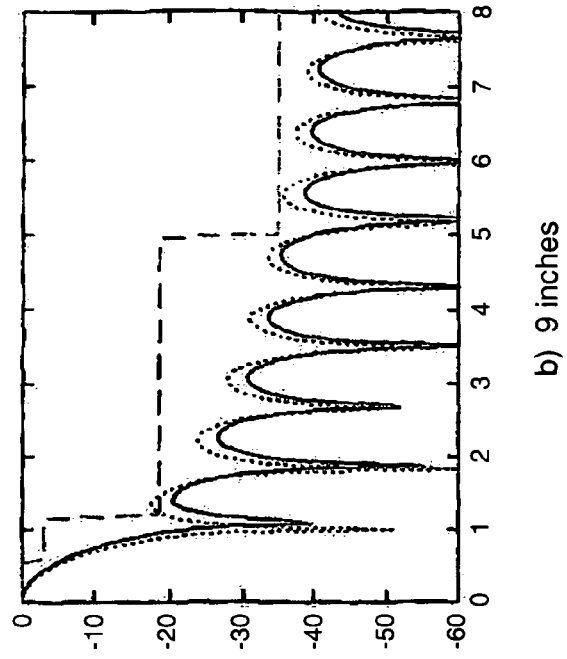
FIG. 12 is two drawings showing the comparison with FCC requirements of side lobe patterns for lenses having diameters of 6 inches to 9 inches at a frequency of 83.5 GHz.
Figure 12B:
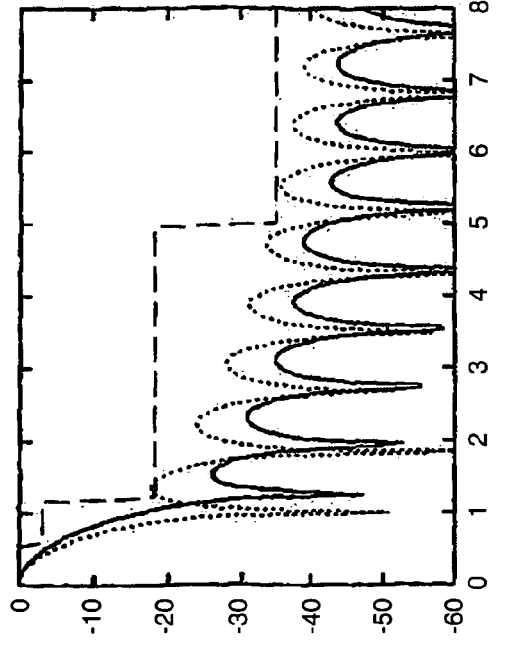

Drawings of two lens-based transceivers suitable for use as the link shown at 12 and 14 in FIGS. 8A and 8B. Components include cylindrical housing 42, lens 31, feed horn 30, transmit electronics 24A, receive electronics 24B, diplexer unit 28, interface electronics module 32, Ethernet or fiber optics input-output 34, mount unit 40, azimuth adjustment 38 and elevation adjustment 36. Outgoing beam is shown at 13 and incoming beam is shown at 15 and the beam width is indicated at 23.

Figure 7:
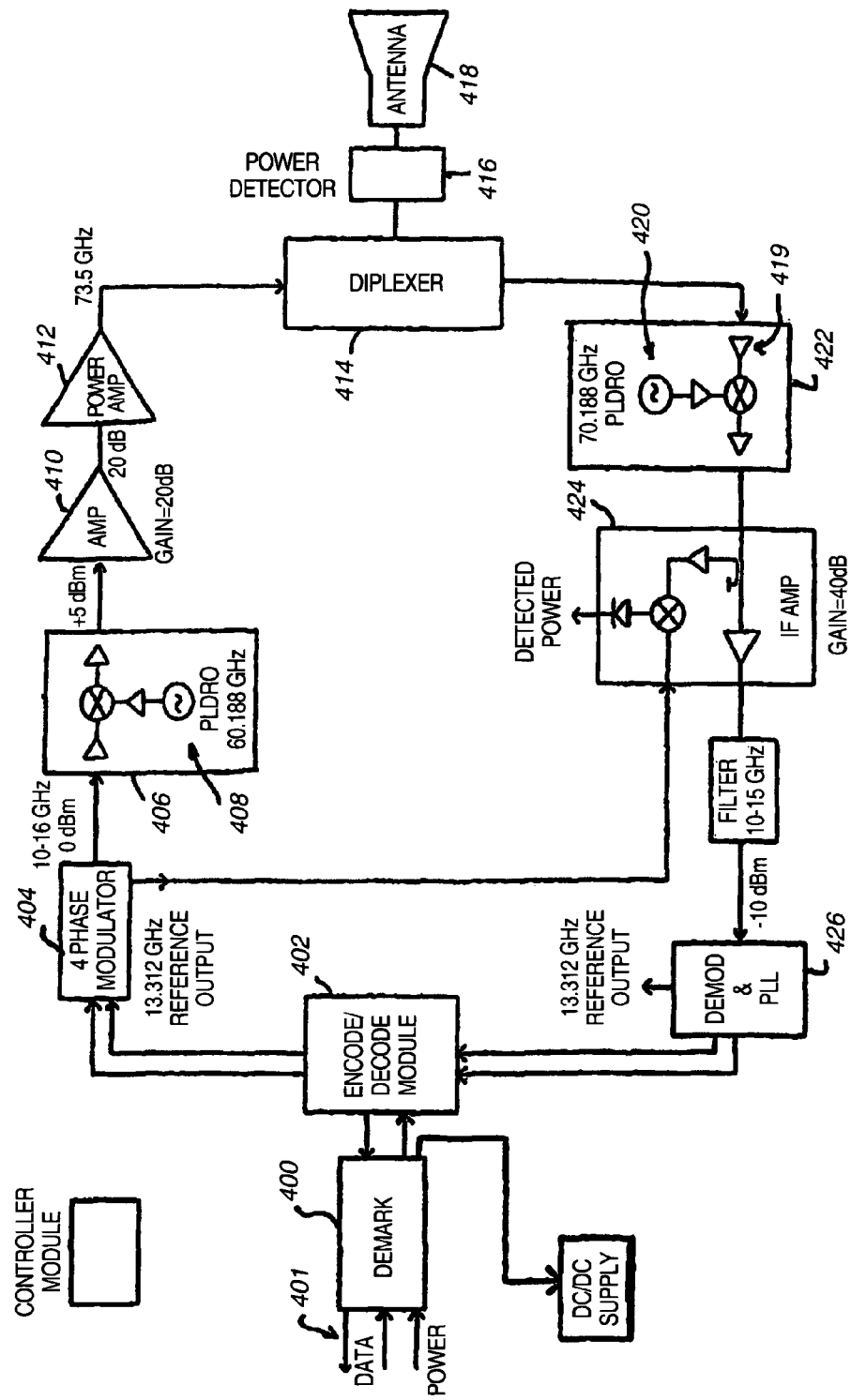
FIG. 7 is a schematic diagram of a millimeter wave transmitter and receiver in an additional preferred embodiment of the present invention.

A lens based transceiver can meet the side lobe requirements at a smaller size than a more commonplace parabolic reflector based transceiver because there is no central obscuration. The present invention provides a transceiver that meets the FCC requirements and also provides a beam divergent enough so that normal expected tower movement will not interfere with transmissions. The design of the transceiver feed horn which illuminates the lens is critical because it determines the size of the intensity distribution on the lens. FIGS. 11A-F show antenna side lobes for six spot sizes from 5 inches to 10 inches on a 9.85 inch diameter lens. If the spot size on the lens is too small, the divergence will be too large, and the main side lobe will not meet the required FCC mask at 1.2 degrees, as in FIG. 7a. If the spot size on the lens is too large, the divergence will be smaller, but there will be larger side lobes between 5 and 10 degrees, and interference with the FCC mask in that region. The side lobes are measured in both the horizontal and vertical direction. The polarization preferably will be in the horizontal or vertical direction. The minimum size lens, and thus the minimum size package, will be achieved if the pattern from the feed horn is approximately the same in both directions, one of which is called the E-plane and one of which is called the H-plane.

Linking Cellular Base Stations

An important application of the present invention is to provide wireless communication among wireless users through a number of cellular base stations. Some of the base stations may be mobile base stations in which low and high speed wireless transceivers are mounted on a temporarily stationary mobile vehicle such as a truck trailer or a truck. Systems include at least one connecting station with a millimeter wave wireless transceiver in communication with a fiber optic or high-speed cable communication network. Each of the base stations serves a separate communication cell. Each base station is equipped with a low frequency wireless transceiver for communicating with the wireless users within the cell at a radio frequency lower than 6 GHz and a millimeter wave wireless transceiver operating at a millimeter wave frequency higher than 60 GHz for communicating with another millimeter wave transceiver at another base station or a millimeter wave transceiver at said at the connecting station. The base stations are also equipped with data transfer means for transferring data communicated through the low frequency wireless transceiver to the millimeter wave wireless transceiver and for transferring data communicated through the millimeter wave wireless transceiver to the low frequency wireless transceiver. In preferred embodiments the system is a part of a telephone system, an Internet system or a computer network.

The antennas at the base station provide beam divergence small enough to ensure efficient spatial and directional partitioning of the data channels so that an almost unlimited number of point-to-point transceivers will be able to simultaneously use the same millimeter wave spectrum. In preferred embodiments the millimeter wave trunk line interfaces with an Internet network at an Internet point of presence. In these preferred embodiments a large number of base stations are each allocated a few MHz portion of the 5 GHz bandwidths of the millimeter wave trunk line in each direction. A first transceiver transmits at 71-76 GHz and receives at 81-86 GHz, both within the above spectral range. A second transceiver transmits at 81-86 GHz and receives at 71-76 GHz.

The millimeter wave trunk line bandwidth is efficiently utilized over and over again by using transmitting antennae that are designed to produce very narrow beams directed at receiving antennae. The low frequency wireless internet access bandwidth is efficiently utilized over and over again by dividing a territory into small cells and using low power antennae. In preferred embodiments wireless internet access base stations are prepackaged for easy, quick installation at convenient locations such as the tops of commercial buildings. In other embodiments the base stations may be mounted on trucks that can be moved quickly to a location to provide emergency or temporary high data rate communication.

Cellular Phone Base Station

Figure 3A:
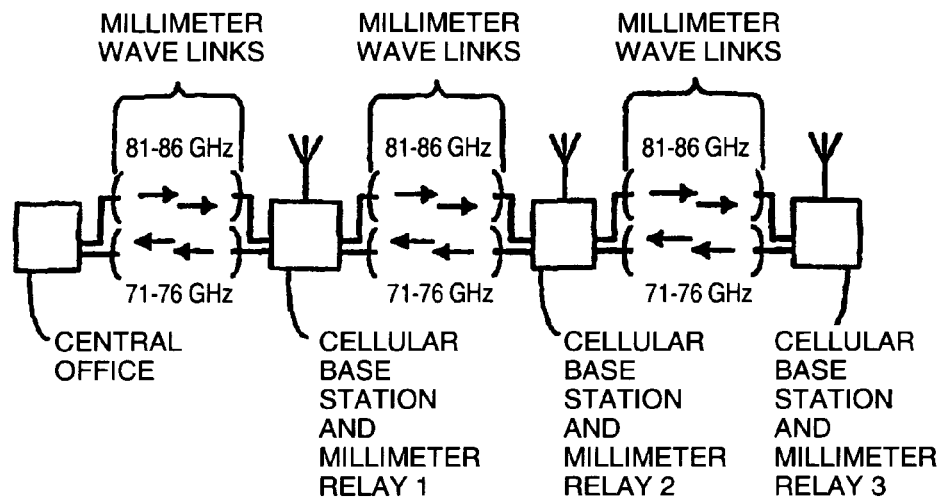
FIG. 3A is a sketch of a millimeter wave trunk line connecting cellular base stations.

A typical prior art cell phone base station transmits in the 824-851 MHz band and receives in the 869-901 MHz band and is connected to a mobile telephone switching office by wire connections which is in turn connected to a central office via a high speed wired connection. The central office performs call switching and routing. It is possible to replace both wired links with a millimeter-wave link, capable of carrying the signals from several cellular base stations to the central office for switching and routing, and then back out again to the cellular base stations for transmission to the users' cellular phones and other communication devices. A millimeter-wave link with 1 GHz of bandwidth will be capable of handling approximately 30 to 90 cellular base stations, depending on the bandwidth of the base stations. Since the cellular base stations are typically within a few miles (or less for micro cells) of each other, the millimeter-wave link would form a chain from base station to base station, then back to the central office. FIG. 3A illustrates the basic concept for a telephone system.

Cellular Base Station Transmission Back to Cellular System Central Office Cell phone calls may be received in the 824-851 MHz band at each group of base stations, and up-converted to a 27 MHz slot of frequencies in the 71-76 GHz band for transmission over the link back to the central office of the content distribution network. Each group of base stations is allocated a 27 MHz slice of spectrum in the 71-76 GHz band as follows:

| 1 Base Station Group Number | Base Station Frequency | Trunk Line Frequency |
|---|---|---|
| 1 | 824-851 MHz | 72.293-72.320 GHz |
| 2 | 824-851 MHz | 72.370-72.397 GHz |
| 3 | 824-851 MHz | 72.447-72.474 GHz |
| . | . | . |
| . | . | . |
| . | . | . |
| 30 | 824-851 MHz | 74.526-74.553 GHz |
| 31 | 824-851 MHz | 74.603-74.630 GHz |
| 32 | 824-851 MHz | 74.680-74.707 GHz |

Figure 4A:
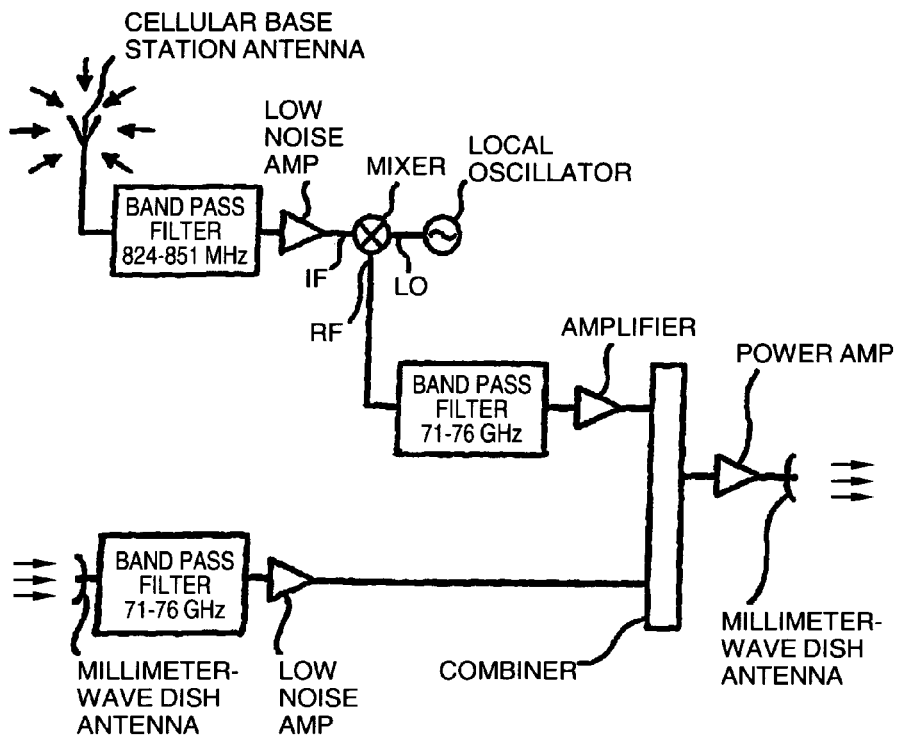
FIG. 4A demonstrates up conversion from cell phone frequencies to trunk line frequencies.

FIG. 4A shows a block diagram of a system that converts the cellular base station frequencies up to the millimeter-wave band for transmission back to the central office or the CDN point of presence. Each base station receives both the cell phone frequencies within its cell, and the millimeter-wave frequencies from the earlier base station in the chain. The cell-phone frequencies are up-converted to a slot (of spectrum) in the 71-76 GHz band and added to the 71-76 GHz signals from the earlier base station up the chain. The combined signals are then retransmitted to the next base station in the chain. Each base station has a local oscillator set to a slightly different frequency, which determines the up-converted frequency slot for that base station. The local oscillator may be multiplied by a known pseudo-random bit stream to spread its spectrum and to provide additional security to the millimeter-wave link.

At the telephone company central switching office, each 27 MHz slot of frequencies in the 71-76 GHz band is down-converted to the cellular telephone band. If a spread-spectrum local oscillator was used on the millimeter-wave link, the appropriate pseudo random code must be used again in the down-converter's local oscillator to recover the original information. Once the millimeter-wave signals are down-converted to the cell phone band, standard cellular equipment is used to detect, switch, and route the calls.

Central Office Transmission to Cellular Base Stations

Cell phone calls leave the central office on a millimeter-wave link and each group of cellular base stations down converts a 32 MHz slice of the spectrum to the cell phone band for transmission to the individual phones. The cellular base stations transmit (to the phones) in the 869-901 MHz band so each group of base stations requires a 32 MHz slice of the spectrum in the 81-86 GHz range on the millimeter wave link. The 5 GHz bandwidth will easily support 32 base stations. Each group of base stations is allocated a 32 MHz slice of spectrum in the 81-86 GHz band as follows:

| Base station # Trunk Line Frequencies (link RX) Converts to Base Station (cell TX) | | |
|---|---|---|
| Base Station Group Number | Trunk Line Frequency | Base Station Frequency |
| 1 | 82.213-82.245 GHz | 869-901 MHz |
| 2 | 82.295-82.327 GHz | 869-901 MHz |
| 3 | 82.377-82.409 GHz | 869-901 MHz |
| . | . | . |
| . | . | . |
| . | . | . |
| 30 | 84.591-84.623 GHz | 869-901 MHz |
| 31 | 84.673-84.705 GHz | 869-901 MHz |
| 32 | 84.755-84.787 GHz | 869-901 MHz |

Figure 5A:
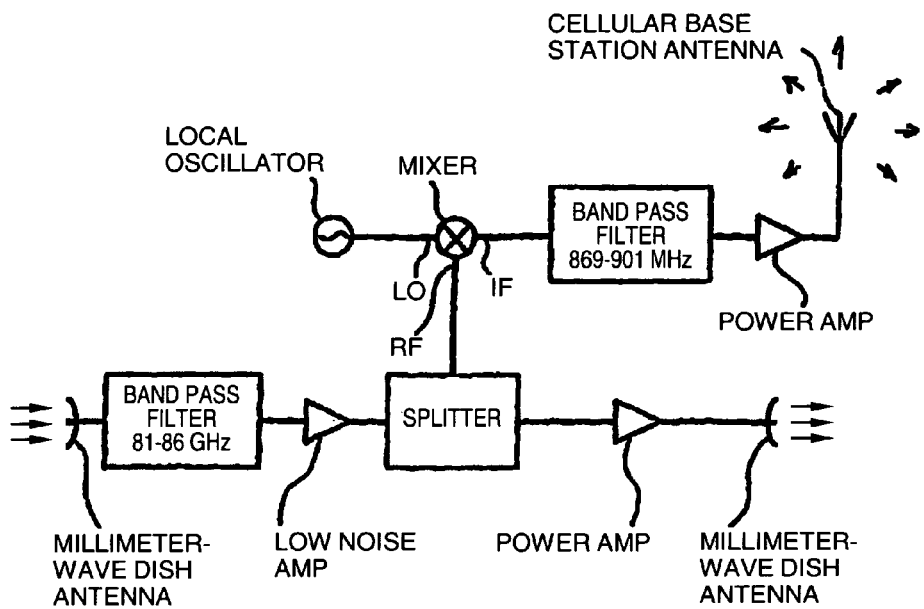
FIG. 5B demonstrates down conversion from trunk line frequencies to wireless internet access frequencies.

FIG. 5A shows a block diagram of a system that receives millimeter-wave signals from the central office and converts them to the cellular band for transmission by a cell base station. Each base station receiver picks off the signals in its 32 MHz slice of the 81-86 GHz spectrum, down-converts this band to the cell phone band, and broadcasts it. The 81-86 GHz band is also retransmitted to the next base station in the chain. Each base station has a local oscillator set to a slightly different frequency, which determines the 32 MHz wide slot (in the 81-86 GHz band) that is assigned to that base station. If a spread-spectrum local oscillator was used on the up-conversion at the central office, then the appropriate pseudo random code must be used again in the down-converter's local oscillator (at each base station) to recover the original information.

At the central switching office calls are detected, switched, and routed between the various cellular base stations and the landline network. Each group of cellular base stations is represented at the central office by a 32 MHz wide slot of spectrum, which is up-converted to the 81-86 GHz band and sent out over a point-to-point link to the chain of several base stations. The local oscillator used to up-convert the signals may be spread-spectrum to provide additional security to the millimeter-wave link.

Wireless Computer Networks and Wireless Internet

Figure 1:
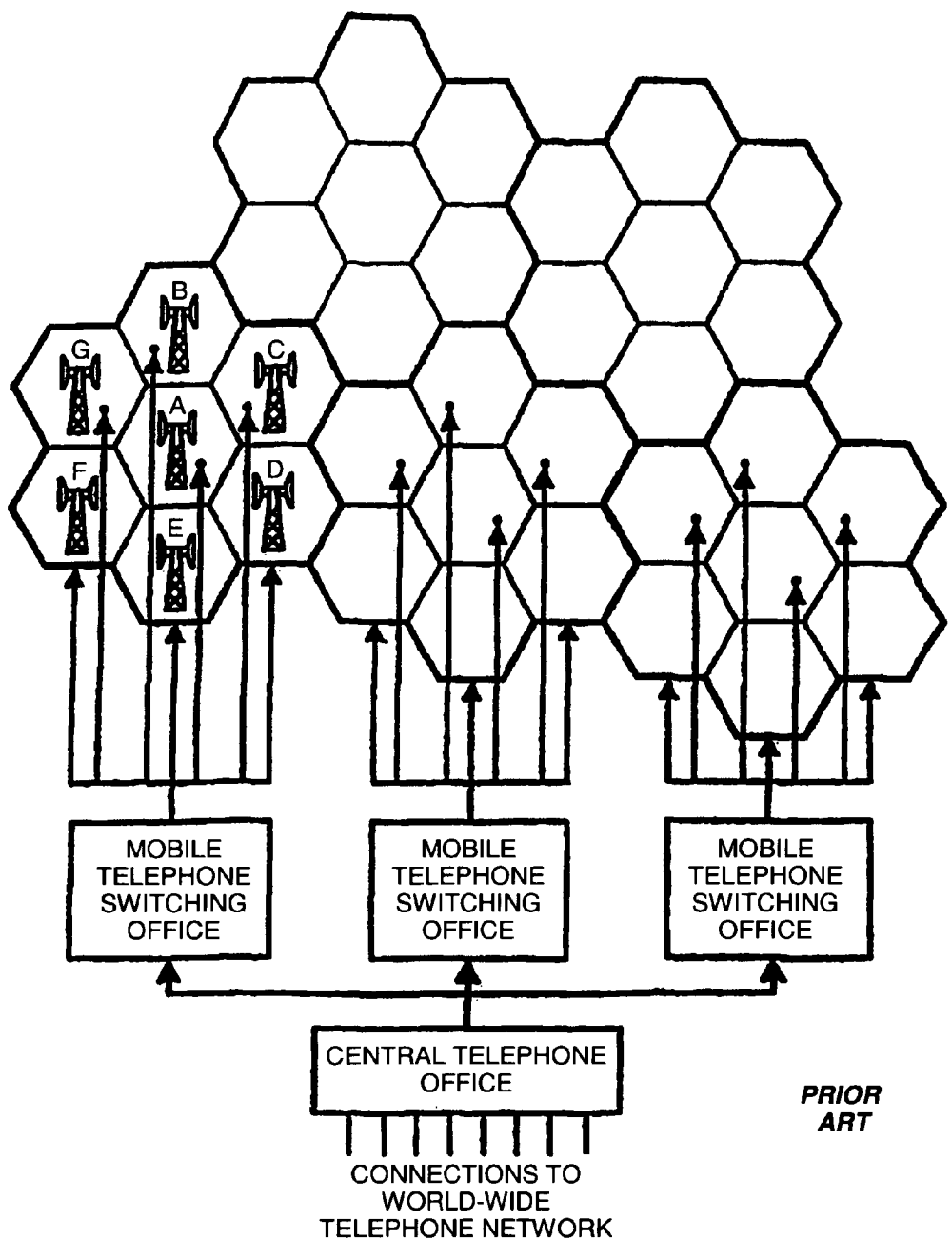
FIG. 1 is a sketch showing a prior art cellular network.
Figure 2:
FIG. 2 is a sketch showing features of a single prior art cell.

Most wireless computer networking equipment on the market today is designed according to IEEE standards 802.11a and 802.11b that describe a format and technique for packet data interchange between computers. In this equipment the 802.11b formatted data is transmitted and received on one of eleven channels in the 2.4-2.5 GHz band and uses the same frequencies for transmit and receive. Therefore, in preferred embodiments the cellular stations all operate on a slice of the 2.4 to 2.5 GHz band using equipment built in accordance with the above IEEE standards. An up/down converter is provided to up and down convert the information for transmittal on the millimeter wave links. The up/down converter is described below. Typically, base stations are organized in generally hexagonal cells in groups of 7 cells (similar to cellular phone networks) as shown in FIG. 1. In order to avoid interference, each of the 7 cells operate at a different slice of the available bandwidth in which case each frequency slice is separated by two cells. If 3 different frequencies are used in the group of 7 cells, there is a one-cell separation of frequencies.

A typical prior art wireless internet access base station, or access point, providing wireless computer networking, transmits and receives in one of a few designated bands. These bands include the 2.4 GHz unlicensed band, with typical operation between 2.4 and 2.4835 GHz (radios using IEEE standards 802.11b or 802.11 g operate in this band), the 3.5 GHz licensed band, with typical operation between 3.4 and 3.6 GHz (radios using IEEE standards 802.16c and 802.16d operate in this band), and the license exempt 5.8 GHz band, with typical operation between 5.725 and 5.85 GHz (this band is part of the FCC designated U-NII band intended for community networking communications devices operating over a range of several kilometers). The 802.16 standards for wireless computer networking are sometimes referred to as WiMax. The 802.11 standards are sometimes referred to as Wi-Fi. These standards can be used in many different frequency bands as specified in the IEEE standards. In the specifications which follow, specific implementation examples have been given in the 5.725 GHz to 5.85 GHz band, but this is not to be taken as any limitation.

Figure 3B:
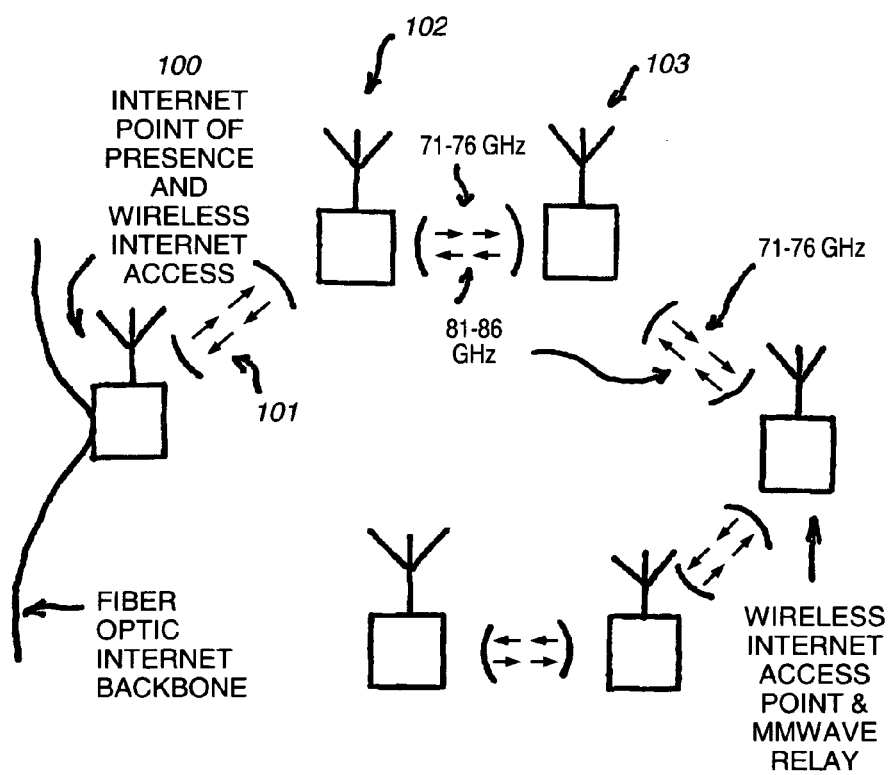
FIG. 3B is a sketch of a millimeter wave trunk line connecting wireless internet access base stations.

FIG. 3B shows how wireless internet access points (or WiMax or WiFi or wireless computer networking access points) might be connected to the fiber optic internet backbone according to the present invention. At some location 100 on the Internet backbone there is what is referred to as a "point of presence", which is a location where there is access to the fiber backbone. Alternately, there could be a switch or router at this location without any wireless access point. In the figure, a high speed millimeter wave communications link 101 provides a connection between this point of presence and a second wireless internet access point 102 at a location remote from the fiber point of presence, but visible through an unobstructed line of sight. The wireless internet access point provides wireless internet or other computing connections to users within some geographic region surrounding the access point, using equipment according to one of the wireless standards (such as IEEE 801.16) and radios operating in one of the designated frequency bands (such as 5.725 to 5.85 GHz). These radios are manufactured and operate according to principles and designs known in the relevant art. Continuing on, this second wireless internet access point communicates with a third wireless internet access point (or base station) 104 through another high bandwidth millimeter wave line of sight communications link 103. In the figure, this communications link is shown to use the 71-76 GHz frequency band in one direction (away from the fiber point of presence) and the 81-86 GHz frequency band in the other direction (towards the fiber point of presence). Because the communications carrying capacity of the high frequency millimeter wave links is much greater than the communications bandwidth needed at each wireless internet access base station, many such base stations can be connected in this manner as indicated generally at 105.

Wireless Internet Base Station Transmission Back to Fiber Point of Presence Wireless computer networking communications traffic is received in the 5725-5850 MHz band at each base station and up-converted to a 125 MHz slot of frequencies in the 81-86 GHz band for transmission over the millimeter wave link back to the fiber point of presence. Each base station is allocated a 125 MHz slice of spectrum in the 81-86 GHz band as follows, with appropriate guard bands (in this case with 50 MHz width):

| Base Station Number | Base Station Frequency | Trunk Line Frequency |
|---|---|---|
| 1 | 5725-5850 MHz | 81.775-81.900 GHz |
| 2 | 5725-5850 MHz | 81.950-82.075 GHz |
| 3 | 5725-5850 MHz | 82.125-82.250 GHz |
| . | . | . |
| . | . | . |
| . | . | . |
| 18 | 5725-5850 MHz | 84.750-84.875 GHz |
| 19 | 5725-5850 MHz | 84.925-85.050 GHz |
| 20 | 5725-5850 MHz | 85.100-85.225 GHz |

Figure 4B:
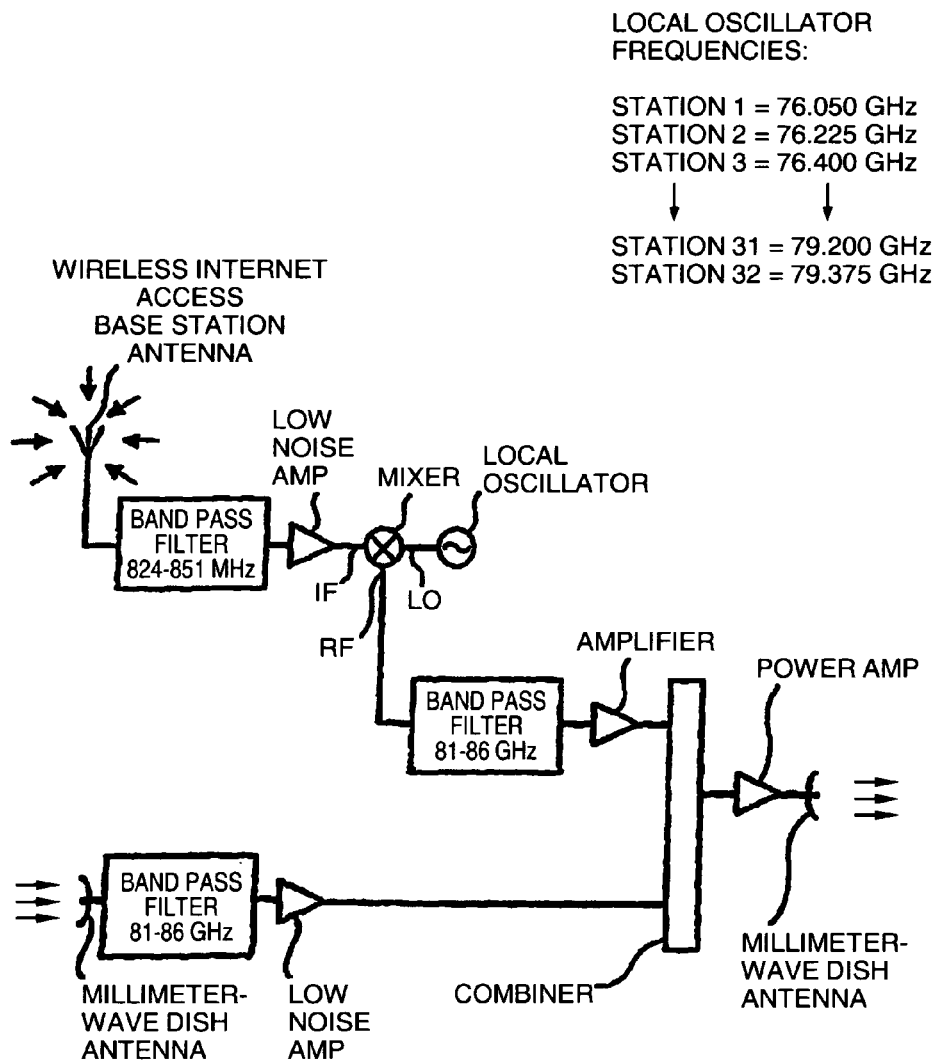
FIG. 4B demonstrates up conversion from wireless internet access frequencies to trunk line frequencies FIG. 5A demonstrates down conversion from trunk line frequencies to cell phone frequencies.

FIG. 4B shows a block diagram of a system that converts the wireless internet base station frequencies up to the millimeter-wave band for transmission back to the central office. Each base station receives both the wireless computer networking frequencies within its geographical coverage area, and the millimeter-wave frequencies from the earlier base station in the chain. The wireless computer networking frequencies are up-converted to a slot (of spectrum) in the 81-86 GHz band and added to the 81-86 GHz signals from the earlier base station up the chain. The combined signals are then retransmitted to the next base station in the chain. Each base station has a local oscillator set to a slightly different frequency, which determines the up-converted frequency slot for the base station.

At the fiber point of presence, each 125 MHz slot of frequencies in the 81-86 GHz band is down-converted to the wireless internet access band, where standard equipment is used to recover the original wireless user traffic. This user traffic is then combined digitally for switching or routing onto the internet backbone, and then on to the desired recipient location.

Fiber Point of Presence Transmission to Wireless Internet Base Stations

Internet or wireless computing traffic with user destinations served by the wireless base stations is separated from the rest of the internet traffic on the backbone at the internet or fiber Point of Presence. The traffic destined for each base station is formatted for the appropriate low frequency wireless channel (for example, 5725-5850 GHz) and then up-converted to a 125 MHz slot in the 71-76 GHz spectrum, with each base station being allocated a different slot. At each base station the appropriate slice of spectrum is then down-converted for transmission to individual users in the 5725 to 5850 GHz band. Since each base station requires less than 125 MHz of bandwidth, the 71-76 GHz millimeter wave spectral band (5,000 MHz) will easily support 20 different base stations, even allowing for 50 MHz guard bands. Each base station is allocated a 125 MHz slice of spectrum in the 71-76 GHz band as follows:

| Base Station Number | Base Station Frequency | Trunk Line Frequency |
|---|---|---|
| 1 | 5725-5850 MHz | 71.775-71.900 GHz |
| 2 | 5725-5850 MHz | 71.950-72.075 GHz |
| 3 | 5725-5850 MHz | 72.125-72.250 GHz |
| . | . | . |
| . | . | . |
| . | . | . |
| 18 | 5725-5850 MHz | 74.750-74.875 GHz |
| 19 | 5725-5850 MHz | 74.925-75.050 GHz |
| 20 | 5725-5850 MHz | 75.100-75.225 GHz |

Figure 5B:
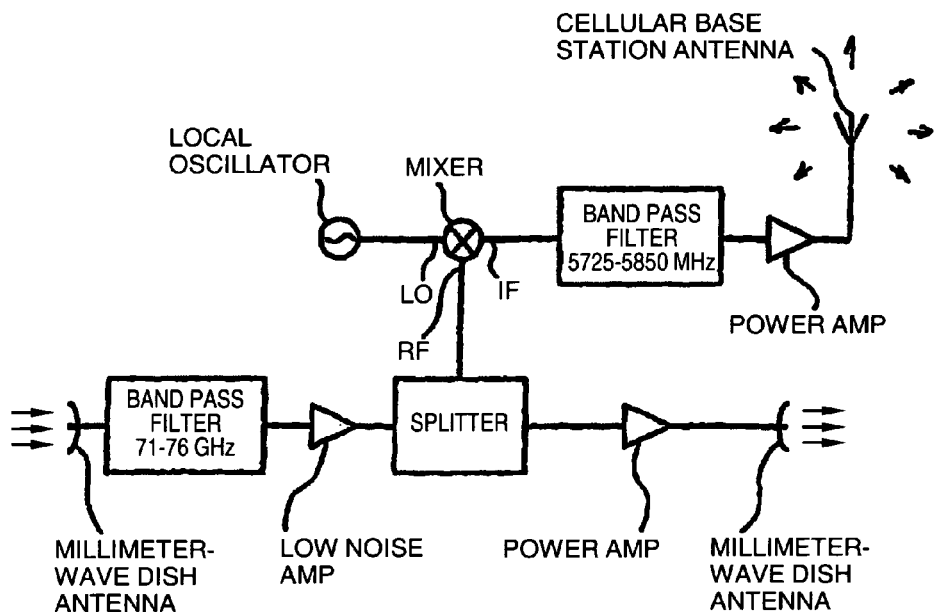

FIG. 5B shows a block diagram of a system that receives millimeter-wave signals from the fiber point of presence and converts them to the wireless internet band for transmission by a wireless base station. Each wireless internet base station picks off the signals in its 125 MHz slice of the 71-76 GHz spectrum, down-converts this slice to the wireless internet band, and broadcasts it. The 71-76 GHz band is also retransmitted to the next base station in the chain. Each base station has a local oscillator set to a slightly different frequency, which determines the 125 MHz wide slot (in the 71-76 GHz band) that is assigned to that base station.

Wi-Fi Hot Spots

Figure 6A:
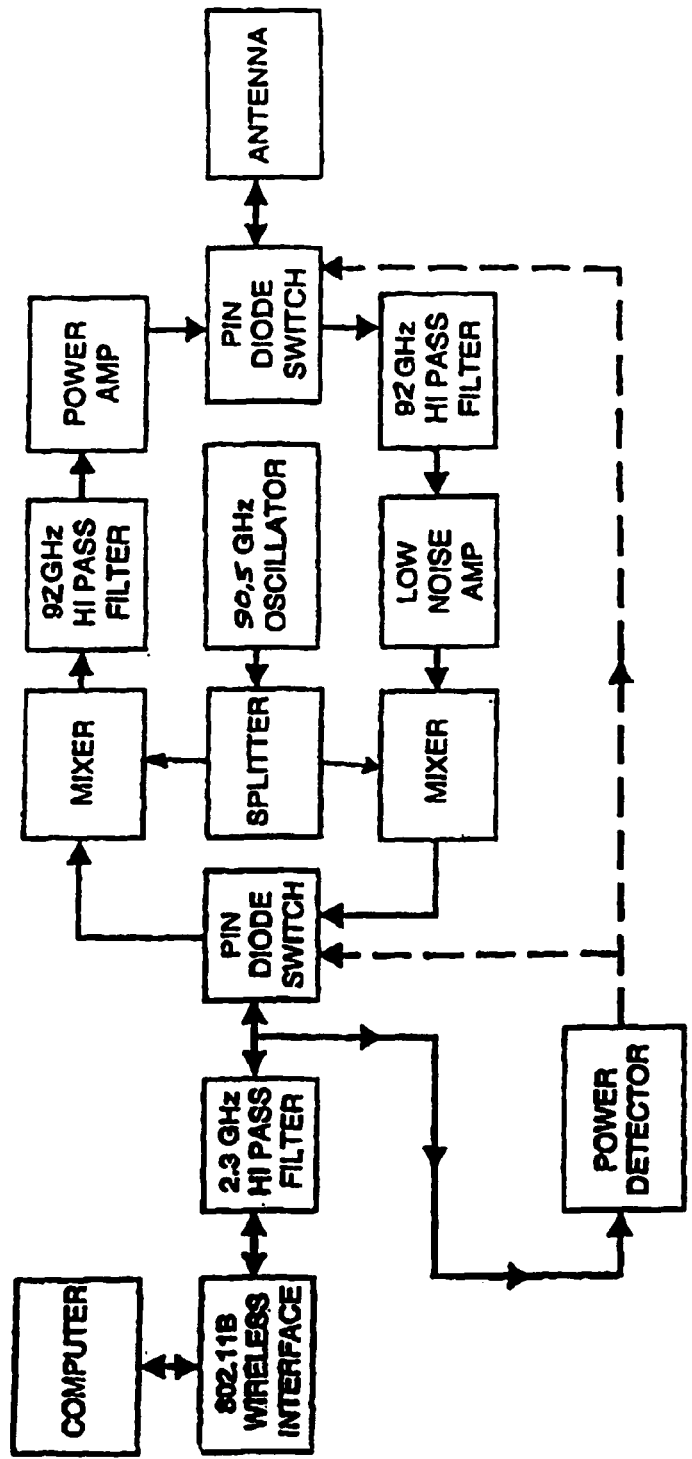
FIG. 6A is a block diagram showing the principal components of a prepackaged wireless internet access station designed for roof-top installation.

In addition to serving wireless internet or WiMax base stations through a millimeter wave trunk line, individual wireless hotspots (Wi-Fi hotspots) based on the IEEE 802.11 standard can be served by a millimeter wave backhaul link as described in FIG. 6A. In this figure, reference is made to frequencies in the 92-94 GHz millimeter wave band (which is part of the 92-94 and 94.1-95 GHz bands allocated by the FCC for point to point millimeter wave links). A computer connected to an 802.11b wireless interface operating in the 2.4-2.4835 GHz ISM band has its communications up-converted to or down-converted from the 92-94 GHz millimeter wave band by combination with a 90.5 GHz local oscillator. Time division duplexing (via a PIN Diode Switch) is used to separate signals to be transmitted by the computer from signals to be received by the computer (or more generally the WiFi hotspot). Signals in the 92-94 GHz millimeter wave band are transmitted by and received by the Antenna in the right of the diagram, and again send and receive are separated at different time slots by a PIN diode switch. Hot Spots such as the one described in FIG. 6A could also be served by trunk line systems operating within the 71 to 76 GHz and 81 to 86 GHz bands described in detail above. The reader should understand that detailed description of lens based systems described in this application have been designed for the 71 to 86 GHz bands to meet FCC requirements. If operation in the 92-95 band is contemplated the designs would need to be modified as needed to fit within the FCC guidelines. Specifically, the FCC requires narrower beams for systems operating in the 92-95 band as compared to the lower frequency bands.

Digital Transmission

In the preferred embodiments for the use of a millimeter wave trunk line serving a series of cellular base stations or wireless computer networking (or internet) base stations discussed thus far, the architecture has been discussed in terms of an analog system wherein low frequency radio or microwave bands associated with each base station were up-converted to specific slots in a high frequency millimeter wave band for transmission back to a central office or to the internet backbone. Different base stations were allocated different slots in the high frequency millimeter wave spectrum. One millimeter wave band (say 71-76 GHz in the case of wireless internet access) was used for transmission from the central network to the base stations, and a different band (say 81-86 GHz in the case of wireless internet access) was used for transmission from the base stations back to the central network. In an alternate preferred embodiment, all of the information received from the low frequency microwave broadcast systems is digitized at the base stations, and combined in a digital fashion for backhaul transmission across the high frequency millimeter wave links. Similarly, the information destined for users of the wireless network is sent from the central office or internet point of presence in a digital format across the high frequency millimeter wave links, and then separated out at each appropriate base station and converted to the appropriate analog waveforms for transmission by the low frequency microwave systems. Standard digital switches and routers can be used for the combination and separation of the digital data, based on user destination addresses embedded in individual data packets.

Figure 6B:
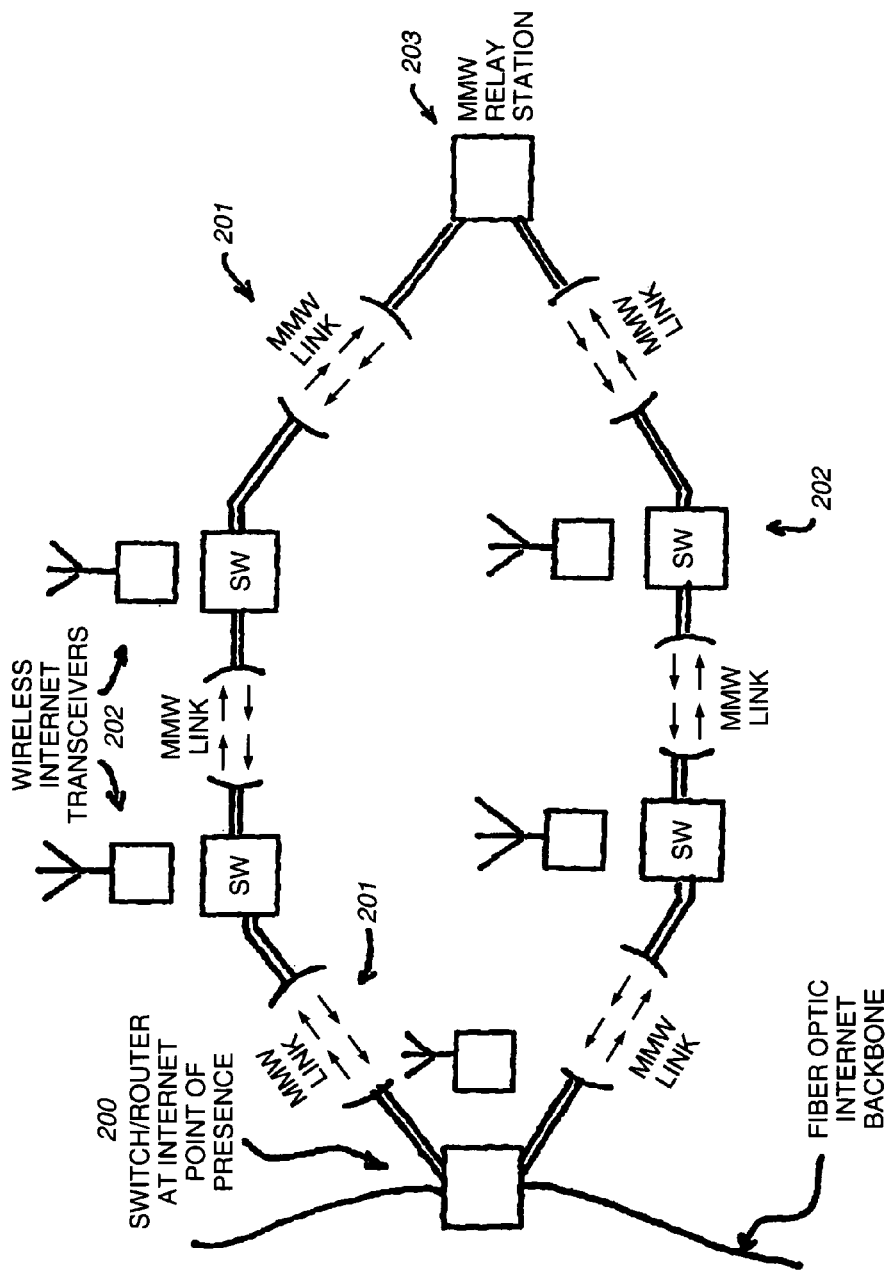
FIG. 6B is a sketch of a millimeter wave trunk line connecting Internet access base stations using digital communication.

FIG. 6B, which is analogous to FIG. 3B, shows a series of wireless internet access point transceivers operating as base stations 202, each with its own coverage area for wireless users, communicating to and from the fiber optic internet backbone at a fiber point of presence 200, using high frequency millimeter wave links. In FIG. 6B, the information on the millimeter wave links is digitized, and transmitted as indicated at 201 using some digital protocol such as gigabit Ethernet at 1.25 Gbps. User communications are separated from the internet backbone using a standard digital switch or router, and then separated from the millimeter wave links using a switch or router at the appropriate destination base station. Similarly, user communications are combined with other traffic on the millimeter wave links using switches or routers at each base station. In this way, the millimeter wave links serve in exactly the same way as fiber optic links which carry digital information, except that the millimeter wave links are wireless. In addition, the millimeter wave links and wireless internet access point transceivers can be arranged in a loop or other network configuration to provide redundancy in case of failure at one of the nodes or links. (That is, there are two or more paths that communication traffic can take between the fiber optic backbone and the wireless internet base stations, so that if one path is unavailable, the traffic can be routed along an alternate path).

Figure 6C:
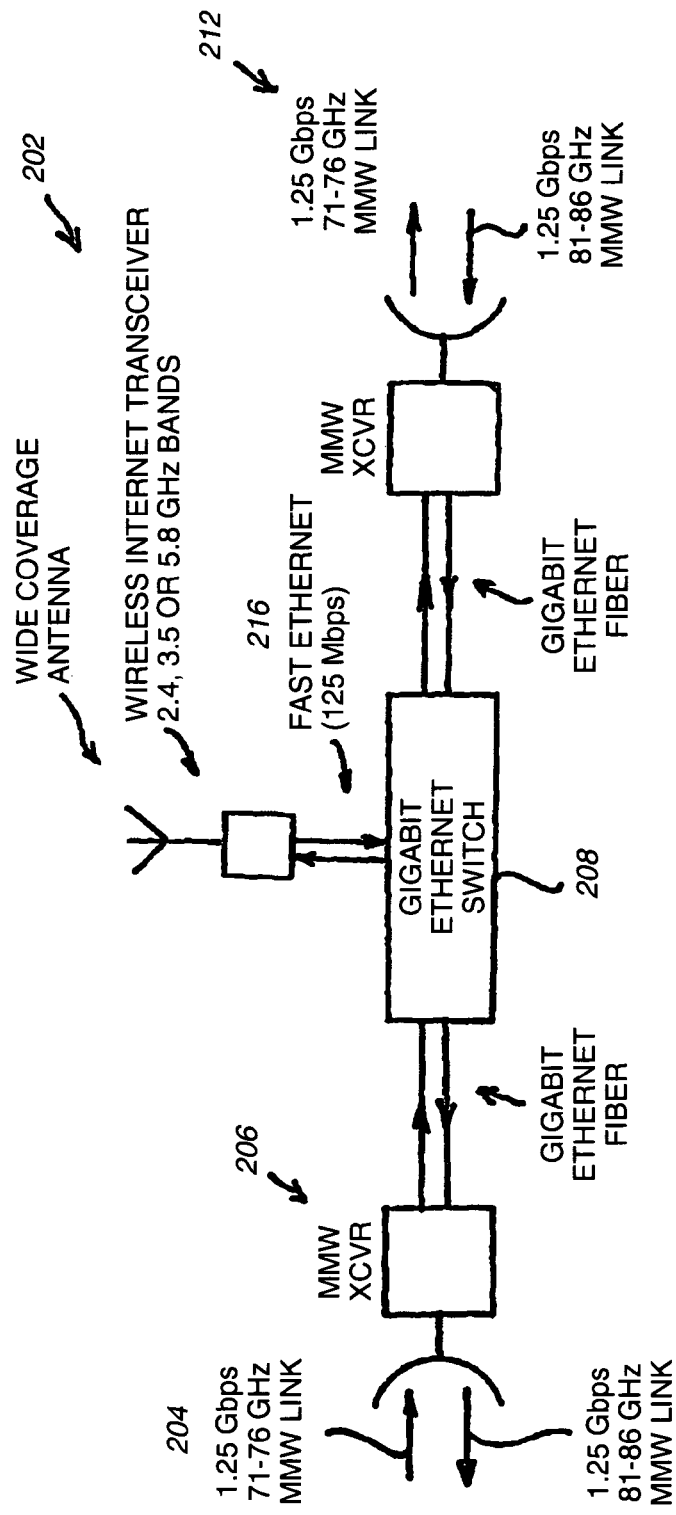
FIG. 6C demonstrates switching of digital wireless Internet traffic on to and off of a trunk line.

FIG. 6C shows details of how the equipment at a base station 202 according to FIG. 6B could be arranged. Information from one millimeter wave link is incident from the left at 204 in the 71-76 GHz millimeter wave band operating at a digital data rate of 1.25 Gbps according to the gigabit Ethernet standard. Millimeter wave transceiver 206 converts the information on the millimeter wave link (which may be modulated by many means including on-off keying, phase shift keying such as BPSK or QPSK, etc.) to digital base band information. Gigabit Ethernet switch 208 separates out any packets from the digital base band data stream which have destinations with wireless users served by that base station, and transfers them via a fast Ethernet link at 125 Mbps to wireless Internet transceiver 210 for broadcast (after appropriate modulation format conversion) from the wireless internet transceiver operating in one of several possible bands such as 2.4, 3.5 or 5.8 GHz. At the same time, information from a second millimeter wave link is incident from the right as shown at 212 in the 81-86 GHz millimeter wave band on a second gigabit Ethernet data stream. This information is converted by the millimeter wave transceiver 210 on the right to base band, and is also processed by the gigabit Ethernet switch 208 to separate out any traffic with a user destination at that base station. User communications which are received by the wireless internet transceiver 214 from users within its geographical coverage area are digitized and transferred to the gigabit Ethernet switch through a 125 Mbps fast Ethernet link 216. The switch then combines this user communications data with data which was received by the switch on the gigabit Ethernet ports from either the left or right transceiver, and sends this out for transmission by either the millimeter wave transceiver on the left or the millimeter wave transceiver on the right, depending on the data packet destination address and the current routing table being used. Data is transmitted along the link to the left at 1.25 Gbps using the 81-86 GHz millimeter wave band, and data is transmitted along the link to the right at 1.25 Gbps using the 71-76 GHz millimeter wave band. While the equipment residing at the base station has been described here as consisting of separate elements (which might currently be purchased from different vendors) it should be appreciated that these separate elements can be combined into a single piece of equipment (or a smaller subset of equipment than that which is shown).

Figure 6D:
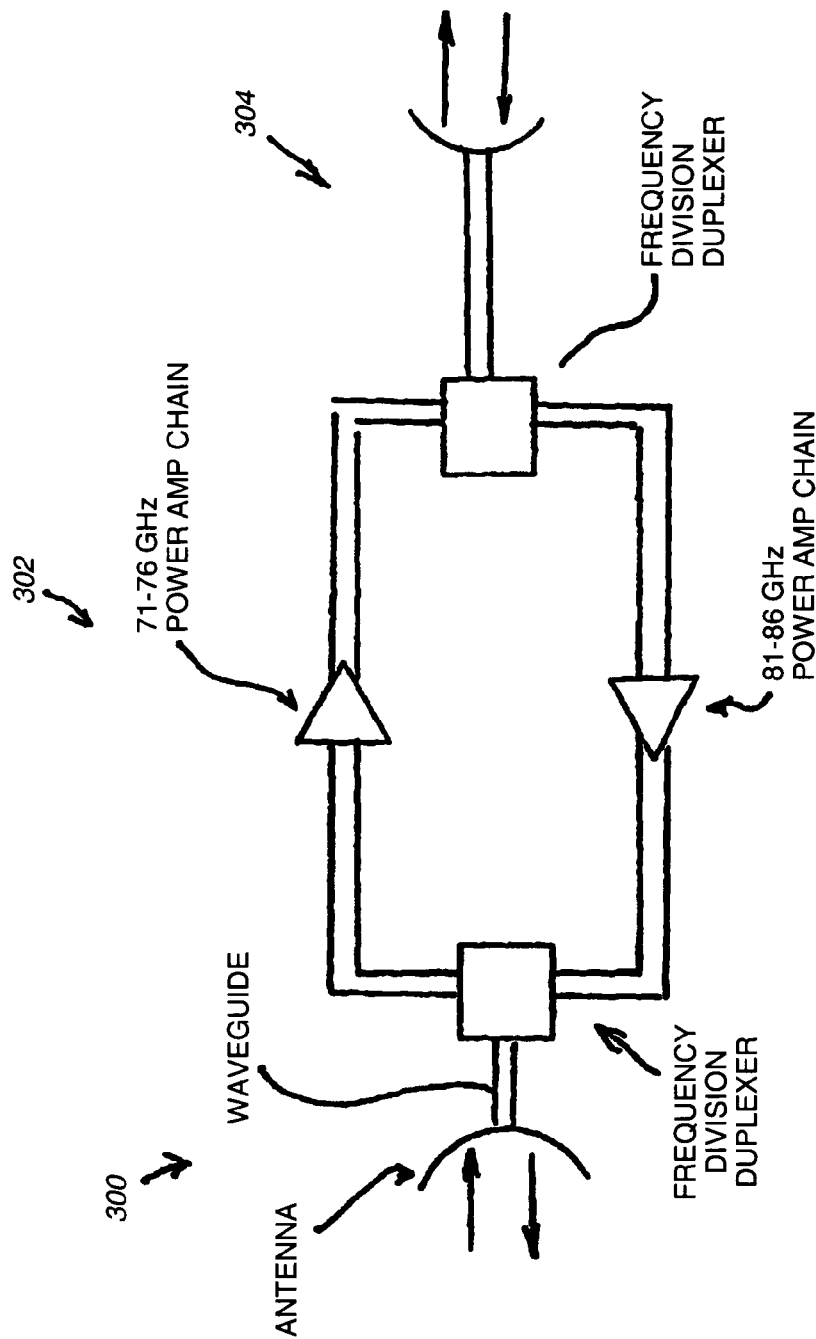
FIG. 6D demonstrates use of a millimeter wave amplifier in a trunk line relay station.
Figure 6E:
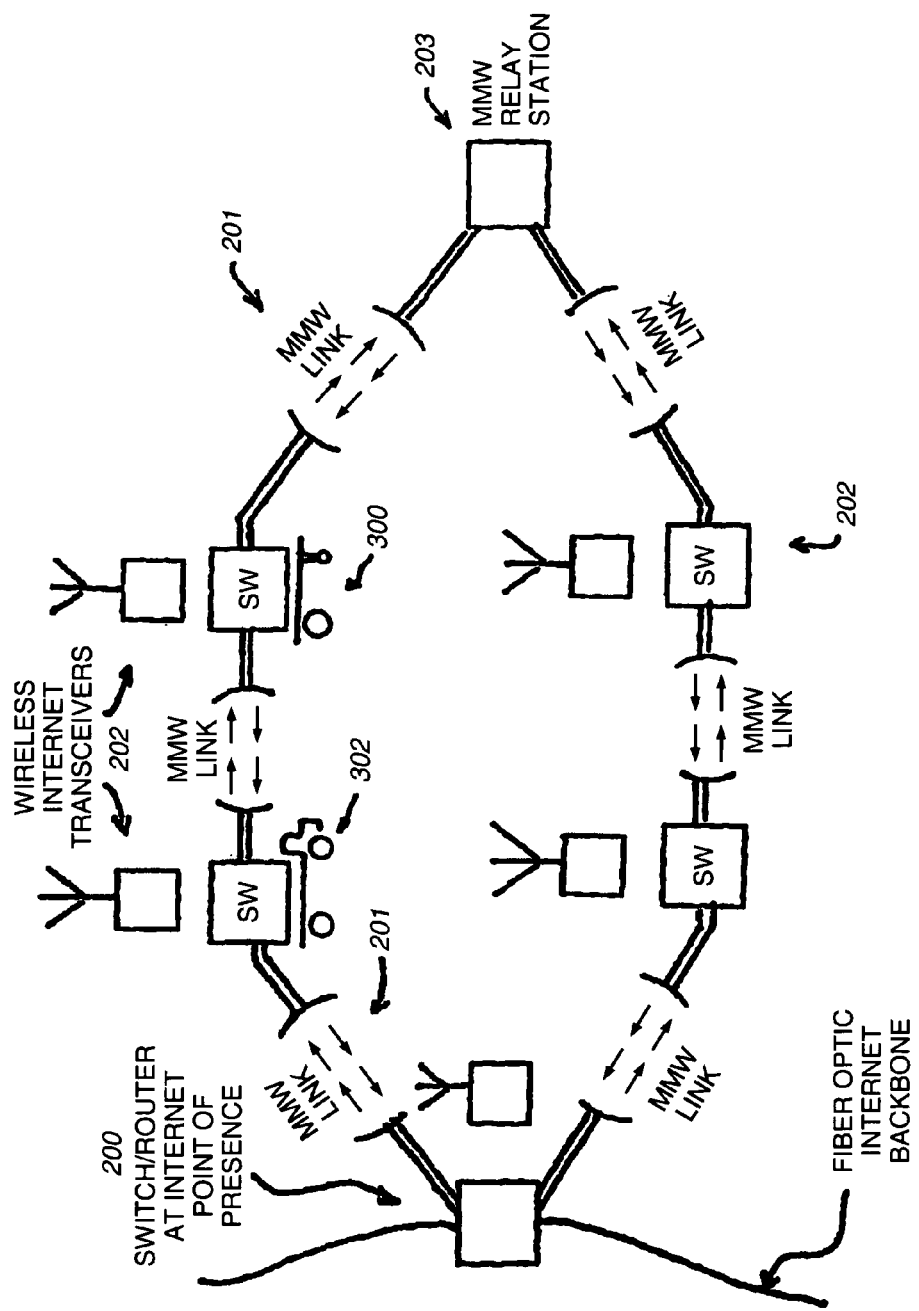
FIG. 6E is the same as FIG. 6B except one of the base stations is mounted on a truck trailer and another base station is mounted on the bed of a flat-bed truck.

FIG. 6B also shows a millimeter wave relay station 203 (at the right) where there is no switch or wireless internet access base station or transceiver. Such a relay station is useful in cases where there is no line of sight link path between two base stations, or where the distance between two base stations is too far to support a millimeter wave link with the desired high weather availability. FIG. 6D shows a possible configuration for such a relay station which does not require any signal down-conversion or up-conversion for operation. In this example, a millimeter wave link operating at 71-76 GHz is incident from the left on an antenna 300. The signal from the antenna is separated by a frequency duplex diplexer capable of separating out frequencies in the 71-76 GHz band from frequencies in the 81-86 GHz band. The incident signal is then amplified by a power amplifier chain 302, which might be a series of amplifiers including a low noise amplifier, a high gain amplifier, and a power amplifier. The amplified signal is then transferred to a second antenna on the right via a second frequency division diplexer for transmission along a millimeter wave link on the right. Note that the data modulation on the signal has not been accessed or converted, but that the power has been amplified and redirected towards another station. Similarly, millimeter wave radiation received by antenna 304 on the right in the 81-86 GHz band is separated by a frequency division diplexer, amplified, and then directed via a frequency division diplexer to the antenna 300 on the left for transmission along the left millimeter wave link. (Although gigabit Ethernet protocol was specified in the examples described above, other protocols for digital transmission, such as OC-24 (1.244 Gbps) or OC-48 (2.488 Gbps) may be used.)

Mobile Base Stations

An important advantage of these millimeter wave systems over prior art systems is that base stations can be installed on mobile vehicles such as truck trailers or on flat-bed trucks that can be moved to base-station sites and be in operation within a few hours or at the most a few days. (Applicants refer to these base stations where all or a large portion of the base station equipment is mounted on a vehicle such as a truck or truck trailer as "mobile base stations", recognizing that when in actual use the mobile base stations will be stationary.) Use of these mobile base stations permits complete new networks to be placed in service within a few days or weeks. In some cases these mobile base stations may be a substantially permanent installation or these mobile stations could provide temporary service until more permanent base stations are constructed. These more permanent base stations could be base stations provided with cable or fiber optic trunk lines or the more permanent facilities could include millimeter wave links that are ground mounted or are mounted on existing buildings or other non-mobile facilities. In fact a "mobile" base station such as a base station mounted on a truck trailer could be converted to a "permanent" base station merely by removing the communication equipment from the trailer and mounting it permanently on structures attached directly or indirectly to the ground.

These mobile base stations could also be utilized as a temporary replacement for base stations damaged or destroyed by events such as a flood or fire. They could also be utilized temporarily while an existing bases station is being upgraded.

Figure 3C:
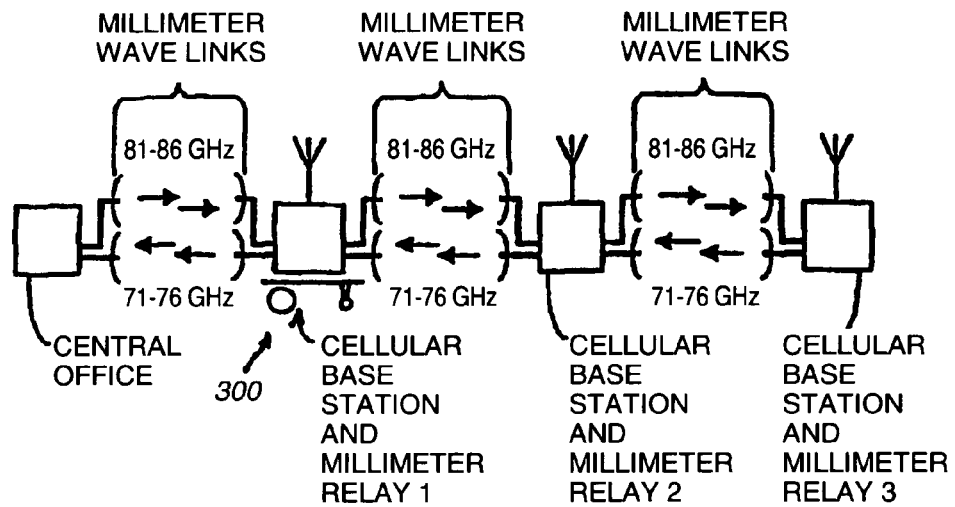
FIG. 3C is the same as FIG. 3A except one of the base stations is mounted on a truck trailer and another base station is mounted on the bed of a flat-bed truck.
Figure 3D:
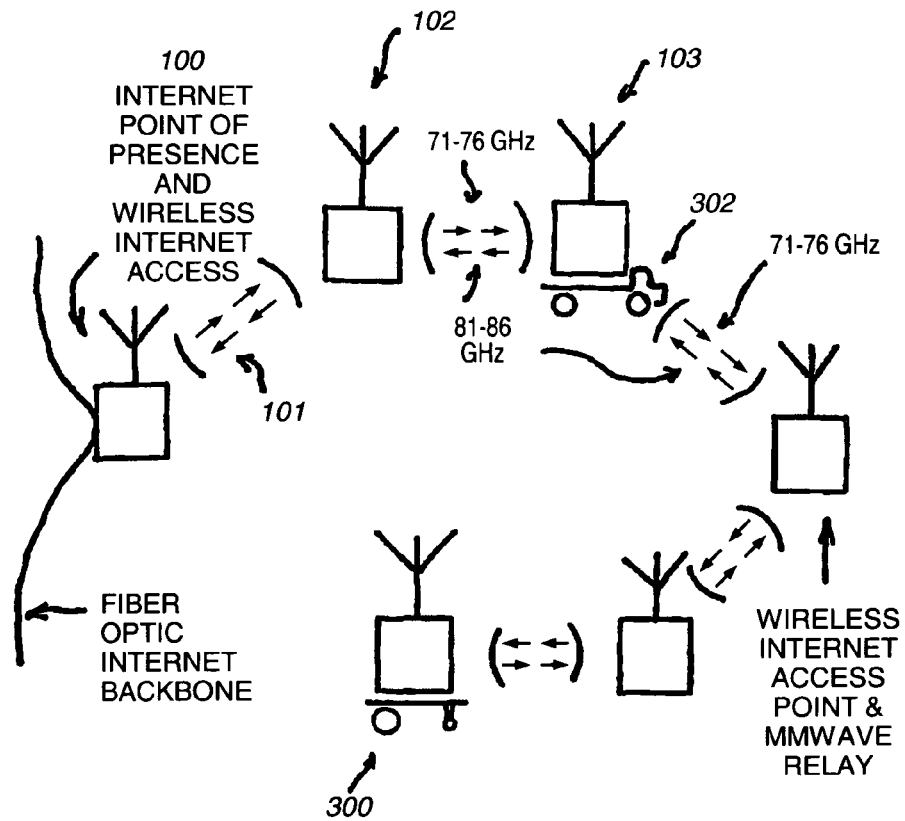
FIG. 3D is the same as FIG. 3B except one of the base stations is mounted on a truck trailer and another base station is mounted on the bed of a flat-bed truck.

FIGS. 3C and 3D are the same as FIGS. 3A and 3B, respectively except in each case conventionally mounted cellular base stations are replaced by mobile mounted base stations 300 and 302. Stations 300 are trailer mounted and stations 302 are mounted on the bed of a flat bed truck.

QPSK Millimeter Wave Radio Transceiver

Figure 14B:
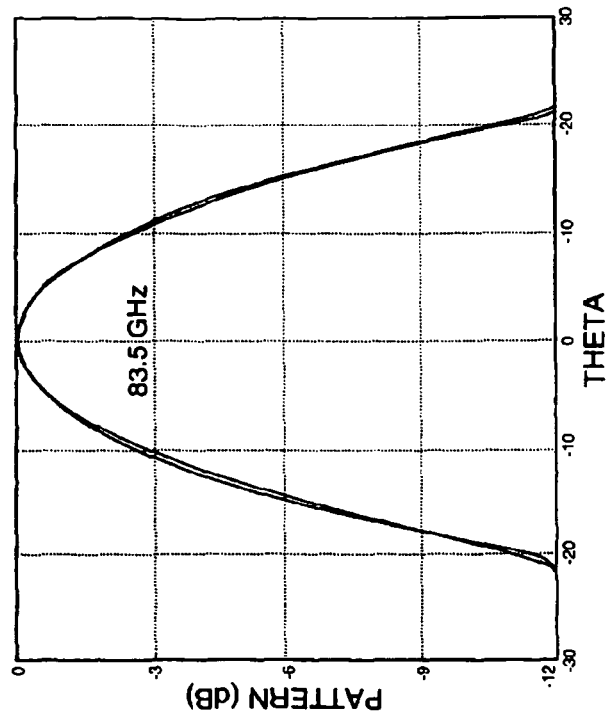
FIGS. 14A an 14B are plots of the beam output profile at 73.5 GHz and 83.5 GHz from the horn shown in FIGS. 9A and 9B.
Figure 14A:
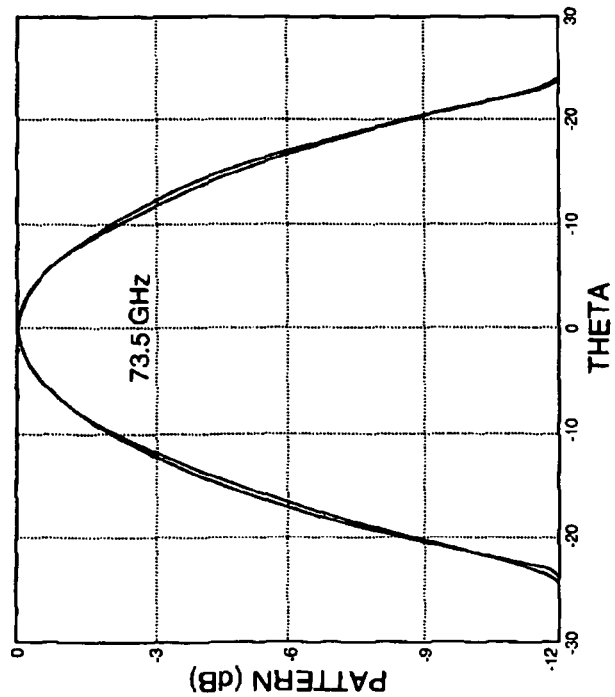
Figure 15:
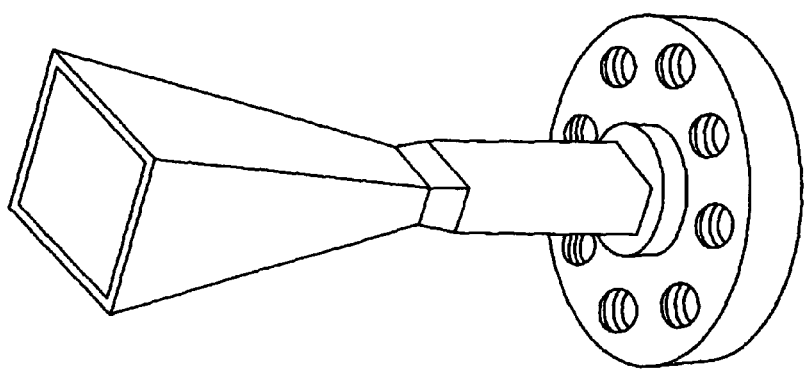
FIG. 15 is a drawing of a test horn and a portion of a scale indicating the size of the horn.
Figure 16:
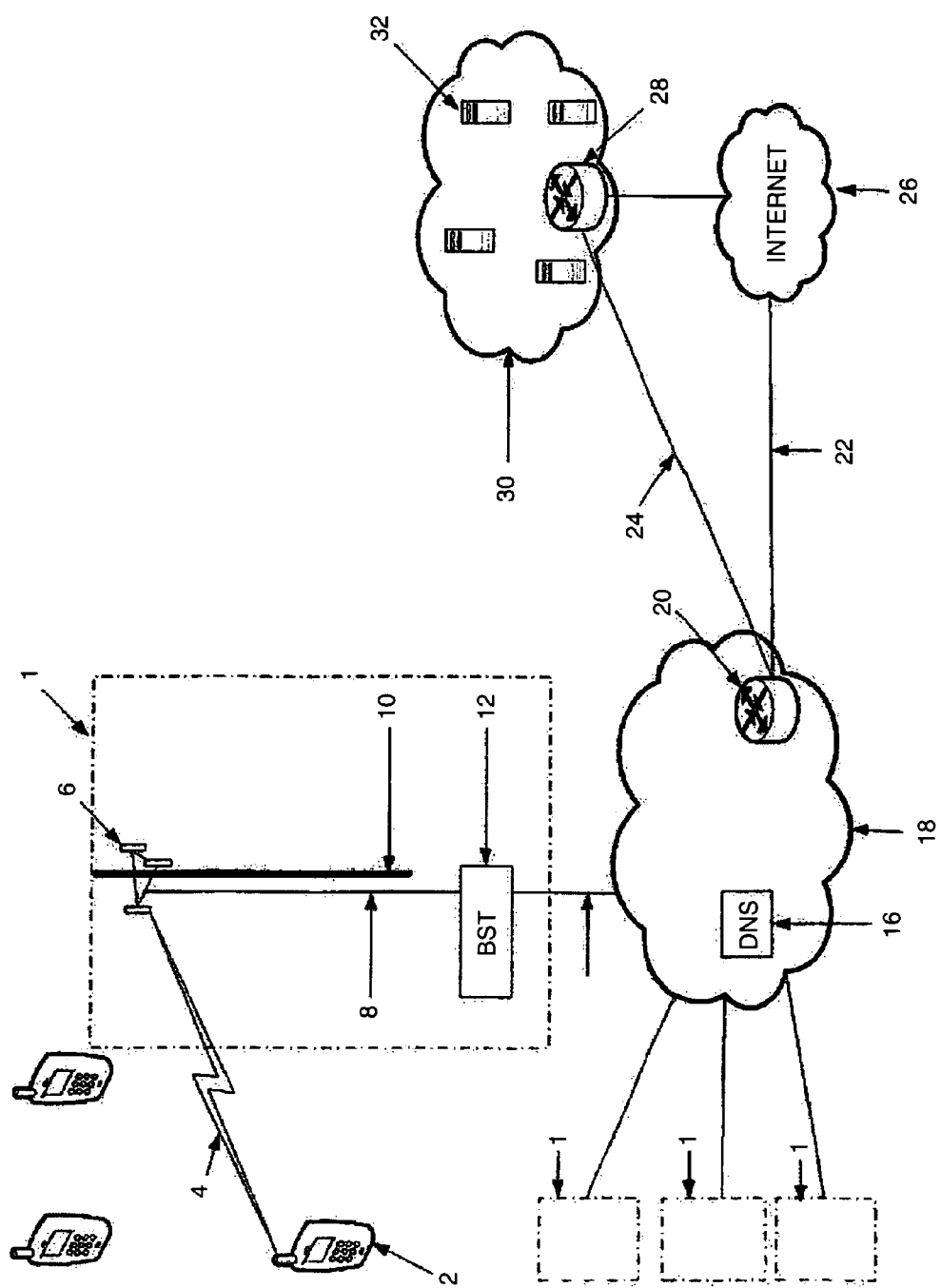
FIG. 16 is a depiction of a prior art cellular base station showing its connection to the Internet.

FIG. 14 shows a preferred embodiment for a millimeter wave radio transceiver being built by Applicants which operates simultaneously from a single antenna in the 71-76 GHz band and the 81-86 GHz band on the same polarization. In the embodiment shown, the transceiver transmits radiation centered at the 73.5 GHz millimeter wave frequency, and receives radiation centered at the 83.5 GHz millimeter wave frequency. A paired transceiver which communicates with the transceiver shown receives at 73.5 GHz and transmits at 83.5 GHz. All of the transceiver modules are identical for the two paired transceivers, except that the local oscillator and mixer module frequencies are reversed. This transceiver is compatible with phase shift keyed modulation, and amplifiers and high power amplifiers which can operate near saturation.

Digital data at a data rate of 2.488 Gbps (corresponding to fiber optic communications standard OC-48) is incident through a fiber optic cable as indicated at 401 to the Demark (Demarcation) box 400 on the left. Power is also supplied to this box, either at 48 V DC, or 110 or 220 V AC. This power is first converted to 48 V DC, and then the power is converted to low voltage DC power of various values such as +/−5V and +/−12 V by DC to DC power supplies for use by the various modules in the transceiver. The incoming 2.488 Gbps data then enters the Encoder module 402 where it is encoded in a format appropriate for QPSK modulation. If no error correction or auxiliary channel bits are desired, the incoming data is demultiplexed (on alternate bits) into two data streams at 1.244 Gbps. If error correction, encryption, or the addition of auxiliary channel bits is desired, these are added at this point resulting in two data streams at a slightly higher data rate. Bits from each data stream are then combined to form a dibit, and subsequent dibits are compared (essentially through a 2 bit subtraction process) to form an I and Q data stream which differentially encodes the incoming data. The I and Q data streams (at 1.244 Gbps if extra bits have not been added) drive a 4 phase modulator 404 which changes the phase of a 13.312 GHz oscillator signal. The output of the 4 phase modulator is a signal at 13.312 GHz as indicated at 404 which has its phase changed through 4 different possible phase values separated by 90 degrees at a baud rate of 1.244 Gbps. The amount of rotation from the previous state depends on the incoming digital dibit. (A 00 corresponds to no phase change, 01 to 90 degree phase change, 10 to 180 degree phase change and 11 to 270 degree phase change). The 13.312 GHz modulated oscillator signal is then combined with a 60.188 GHz local oscillator signal in mixer 406 to form a signal centered at 73.5 GHz. As indicated at 408 the local oscillator utilizes a phase locked dielectric resonant oscillator (PLDRO) signal at 10.031 which has been multiplied in frequency by a factor of 6. The 73.5 GHz signal is then amplified to a power near 20 dBm (100 mW) by a first amplifier module 410, and then (optionally) amplified to a power near 2 W by a power amplifier 412. The amplified signal enters a frequency division diplexer 414 which routes the 73.5 GHz frequency band to an output waveguide, past a power detector 416 (to measure the transit power) and then to a parabolic 2 foot diameter antenna 418 for transmission along a line of sight through free space to the paired transceiver.

At the same time, incoming millimeter wave radiation centered at 83.5 GHz transmitted by a paired transceiver (not shown) is received at the two foot parabolic antenna 418 and passes through the waveguide to the frequency division diplexer. The 83.5 GHz radiation is passed by the diplexer to the lower arm of the diagram in FIG. 14. It is then amplified by low noise amplifier 419 and mixed in mixer 422 with the signal from a local oscillator 420 operating at 70.188 GHz. The 70.188 GHz frequency is generated by multiplying a signal from a phase locked dielectric resonance oscillator (PLDRO) locked to a frequency of 11.698 GHz by a factor of 6 (through a times 2 and a times 3 multiplier). The output of mixer 422 is a signal centered at 13.312 GHz which is filtered and amplified by the IF Amplifier module 424. The receive signal strength is also measured at this stage. After further amplification and filtering, the incoming 13.312 GHz signal enters the demodulation and phase locked loop module 426 where an I and Q digital data stream are extracted. The I and Q data streams at 1.244 Gbaud then enter the decoder module where the 2.488 Gbps data stream sent from the paired transceiver is reconstructed. Decoder 402 basically computes the difference between sequential pairs of I and Q data, which corresponds to the dibits originally encoded at the paired transceiver. (The I and Q are related to the phase of the incoming signal with some ambiguity, but the difference in phase is known. If the phase has changed by 0 degrees, then the transmitted dibit was 00, 90 degrees corresponds to 01, 180 degrees corresponds to 10 and 270 degrees corresponds to 11). The decoded dibits are then remultiplexed into a 2.488 Gb/s data stream for transmission to the demark box 400 and then through fiber optic cable 401 to the user.

Backup Microwave Transceiver Pair

During severe weather conditions data transmission quality will deteriorate at millimeter wave frequencies. Therefore, in preferred embodiments of the present invention a backup communication link is provided which automatically goes into action whenever a predetermined drop-off in quality transmission is detected. A preferred backup system is a microwave transceiver pair operating in the 10.7-11.7 GHz band. This frequency band is already allocated by the FCC for fixed point-to-point operation. FCC service rules parcel the band into channels of 40-MHz maximum bandwidth, limiting the maximum data rate for digital transmissions to 45 Mbps full duplex. Transceivers offering this data rate within this band are available: off-the-shelf from vendors such as Western Multiplex Corporation (Models Lynx DS-3, Tsunami 100 BaseT), and DMC Stratex Networks (Model DXR700 and Altium 155). The digital radios are licensed under FCC Part 101 regulations. The microwave antennas are Cassegrain dish antennas of 24-inch diameter. At this diameter, the half-power beamwidth of the dish antenna is 3.0 degrees, and the full-power beamwidth is 7.4 degrees, so the risk of interference is higher than for MMW antennas. To compensate this, the FCC allocates twelve separate transmit and twelve separate receive channels for spectrum coordination within the 10.7-11.7 GHz band. Sensing of a millimeter wave link failure and switching to redundant microwave channel is an existing automated feature of the network routing switching hardware available off-the-shelf from vendors such as Cisco, Foundry Networks and Juniper Networks.

The reader should understand that in many installations the provision of a backup system will not be justified from a cost-benefit analysis depending on factors such as costs, distance between transmitters, quality of service expected and the willingness of customers to pay for continuing service in the worse weather conditions.

Coarse and Fine Pointing

Pointing a high-gain antenna requires coarse and fine positioning. Coarse positioning can be accomplished initially using a visual sight such as a bore-sighted rifle scope or laser pointer. The antenna is locked in its final coarse position prior to fine-tuning. The fine adjustment is performed with the remote transmitter turned on. A power meter connected to the receiver is monitored for maximum power as the fine positioner is adjusted and locked down.

At gain levels above 50 dB, wind loading and tower or building flexure can cause an unacceptable level of beam wander. A flimsy antenna mount could not only result in loss of service to a wireless customer; it could inadvertently cause interference with other licensed beam paths. In order to maintain transmission only within a specific "pipe," some method for electronic beam steering may be required.

Other Wireless Techniques

Transmit power may be generated with a Gunn diode source, an injection-locked amplifier or a MMW tube source resonating at the chosen carrier frequency or at any subharmonic of that frequency. Source power can be amplitude, frequency or phase modulated using a PIN switch, a mixer or a bi-phase or continuous phase modulator. Modulation can take the form of simple bi-state AM modulation, or can involve more than two symbol states; e.g. using quantized amplitude modulation (QAM). Double-sideband (DSB), single-sideband (SSB) or vestigial sideband (VSB) techniques can be used to pass, suppress or reduce one AM sideband and thereby affect bandwidth efficiency. Phase or frequency modulation schemes can also be used, including simple FM, bi-phase or quadrature phase-shift keying (QPSK) or 8 PSK or higher. Transmission with a full or suppressed carrier can be used. Digital source modulation can be performed at any date rate in bits per second up to eight times the modulation bandwidth in Hertz, using suitable symbol transmission schemes. Analog modulation can also be performed. A monolithic or discrete-component power amplifier can be incorporated after the modulator to boost the output power. Linear or circular polarization can be used in any combination with carrier frequencies to provide polarization and frequency diversity between transmitter and receiver channels. A pair of dishes can be used instead of a single dish to provide spatial diversity in a single transceiver as well.

The MMW Gunn diode and MMW amplifier can be made on indium phosphide, gallium arsenide, or metamorphic InP-on-GaAs. The MMW amplifier can be eliminated completely for short-range links. The mixer/downconverter can be made on a monolithic integrated circuit or fabricated from discrete mixer diodes on doped silicon, gallium arsenide, or indium phosphide. The phase lock loop can use a microprocessor-controlled quadrature (I/Q) comparator or a scanning filter. The detector can be fabricated on silicon or gallium arsenide, or can comprise a heterostructure diode using indium antimonide.

The backup transceivers can use alternative bands 5.9-6.9 GHz, 17.7-19.7 GHz, or 21.2-23.6 GHz; all of which are covered under FCC Part 101 licensing regulations. The antennas can be Cassegrain, offset or prime focus dishes, or flat panel slot array antennas, of any size appropriate to achieve suitable gain.

The preferred embodiment contains a rich array of features. Alternative embodiments include single-carrier networks that do not benefit from the shared connection of base stations to advanced networking services such as content distribution and digital rights management networks. Similarly, alternative embodiments include architectures in which the wireline CDN and wireless network are not merged.

Additional alternative embodiments include other methods for creating high-speed links between base stations and advanced networking services such as content distribution and digital rights management networks. These include, for example, transceivers that operate at approximately 60 GHz, laser communication systems and fiber optic telecommunication systems. Less preferable, but feasible, are systems are lower bandwidth systems that employ microwave communications, WiMax, DSL or cable.

Additional alternative embodiments provide or backhaul through high-speed connection of the types mentioned above (millimeter wave and other methods) that connect base stations to central and other telecommunication offices that in turn are linked to a content distribution or digital rights management network.

A final alternative embodiment includes links from base stations solely to a digital rights management network. This may be accomplished by millimeter wave link or the other methods referred to above.

While the above description contains many specifications, the reader should not construe these as a limitation on the scope of the invention, but merely as exemplifications of preferred embodiments thereof. Accordingly, the reader is requested to determine the scope of the invention by the appended claims and their legal equivalents, and not by the examples given above.

What is claimed is:

1. A communication system comprising:
   A) at least one computer network,
   B) a plurality of base stations each of which are in direct or indirect communication with said computer network,
   C) a plurality of high data rate millimeter wave radio links providing high data rate communication between said plurality of base stations and said at least one computer network, wherein said plurality of high data rate millimeter wave radio links are adapted to operate at frequencies greater than 60 GHz, at data rates in excess of 1.25 Gbps with a half power beam width of less than two degrees and a minimum antenna gain of 40 dB.

2. The communication system as in claim 1 wherein said plurality of base stations are parts of a plurality of cellular communication networks.

3. The communication system as in claim 1 wherein said millimeter wave links are adapted to operate in frequency ranges within the range of 71 GHz to 86 GHz.

4. The communication system of claim 1 wherein said plurality of high data rate links comprise a plurality of millimeter wave wireless transceivers in communication with a fiber optic or high-speed cable communication network that is a part of said computer network, said plurality of millimeter wave transceivers defining a computer network connected transceiver;
   wherein at least one of said base station in said plurality of base stations is adapted to serve a communication cell with each of said base stations comprising:
   1) at least one low frequency wireless transceiver for communicating with a plurality of users within said communication cell at a radio frequency lower than 6 GHz;
   2) a millimeter wave wireless transceiver operating at a millimeter wave frequency higher than 60 GHz and adapted for communicating with one of said computer network connected millimeter wave transceivers; and
   3) a data transfer means for transferring data communicated through said at least one low frequency transceiver to said at least one millimeter wave wireless transceiver and for transferring data communicated through said at least one millimeter wave wireless transceiver to said at least one low frequency wireless transceiver.

5. The communication system as in claim 1 wherein said computer network is a part of an Internet system.

6. The system as in claim 1 wherein at least one of said plurality of high data rate millimeter wave radio links comprises comprising a back-up transceiver system operating at a data transmittal rate of less than 155 million bits per second configured to continue transmittal of information between said base stations in an event of abnormal weather conditions.

7. The system as in claim 6 wherein said back-up transceiver system is a microwave system.

* * * * *